US011887246B2

(12) United States Patent
Zhou et al.

(10) Patent No.: US 11,887,246 B2
(45) Date of Patent: *Jan. 30, 2024

(54) GENERATING GROUND TRUTH DATASETS FOR VIRTUAL REALITY EXPERIENCES

(71) Applicant: Snap Inc., Santa Monica, CA (US)

(72) Inventors: Kai Zhou, Wr Neudorf (AT); Qi Qi, Los Angeles, CA (US); Jeroen Hol, Hengelo (NL)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/877,451

(22) Filed: Jul. 29, 2022

(65) Prior Publication Data

US 2022/0366639 A1 Nov. 17, 2022

Related U.S. Application Data

(63) Continuation of application No. 17/342,851, filed on Jun. 9, 2021, now Pat. No. 11,417,052.

(Continued)

(51) Int. Cl.
 *G06T 15/20* (2011.01)
 *G06T 7/50* (2017.01)
 (Continued)

(52) U.S. Cl.
 CPC ............ *G06T 15/20* (2013.01); *G06T 7/20* (2013.01); *G06T 7/50* (2017.01); *G06T 7/70* (2017.01);
 (Continued)

(58) Field of Classification Search
 None
 See application file for complete search history.

(56) References Cited

U.S. PATENT DOCUMENTS

| 11,417,052 B2 | 8/2022 | Zhou et al. | |
| 2015/0123763 A1* | 5/2015 | Xu | G06F 3/03 340/5.51 |

(Continued)

FOREIGN PATENT DOCUMENTS

| CN | 105488801 B | 2/2019 |
| WO | 2017190351 A1 | 11/2017 |

OTHER PUBLICATIONS

Christian Kurz et al: "Camera Motion Style Transfer," Visual Media Production (CVMP), 2010 Conference On, IEEE, Piscataway, NJ, USA, Nov. 17, 2010 (Nov. 17, 2010), pp. 9-16.

(Continued)

*Primary Examiner* — Frank S Chen
(74) *Attorney, Agent, or Firm* — Culhane Meadows PLLC; Stephen J. Weed

(57) ABSTRACT

Systems and methods of generating ground truth datasets for producing virtual reality (VR) experiences, for testing simulated sensor configurations, and for training machine-learning algorithms. In one example, a recording device with one or more cameras and one or more inertial measurement units captures images and motion data along a real path through a physical environment. A SLAM application uses the captured data to calculate the trajectory of the recording device. A polynomial interpolation module uses Chebyshev polynomials to generate a continuous time trajectory (CTT) function. The method includes identifying a virtual environment and assembling a simulated sensor configuration, such as a VR headset. Using the CTT function, the method includes generating a ground truth output dataset that represents the simulated sensor configuration in motion along a virtual path through the virtual environment. The virtual path is closely correlated with the motion along the real path as captured by the recording device. Accordingly, the output dataset produces a realistic and life-like VR experience. In (Continued)

addition, the methods described can be used to generate multiple output datasets, at various sample rates, which are useful for training the machine-learning algorithms which are part of many VR systems.

20 Claims, 25 Drawing Sheets

Related U.S. Application Data

(60) Provisional application No. 63/046,150, filed on Jun. 30, 2020.

(51) Int. Cl.
  *G06T 7/70* (2017.01)
  *G06T 7/20* (2017.01)

(52) U.S. Cl.
  CPC ............... *G06T 2207/30241* (2013.01); *G06T 2207/30244* (2013.01)

(56) References Cited

U.S. PATENT DOCUMENTS

| | | |
|---|---|---|
| 2016/0027209 A1 | 1/2016 | Demirli et al. |
| 2016/0189429 A1 | 6/2016 | Mallinson |
| 2020/0150749 A1 | 5/2020 | Kakehashi et al. |

OTHER PUBLICATIONS

International Search Report and Written Opinion for International Application No. PCT/US2021/036555, dated Sep. 23, 2021 (Sep. 23, 2021)—21 pages.

\* cited by examiner

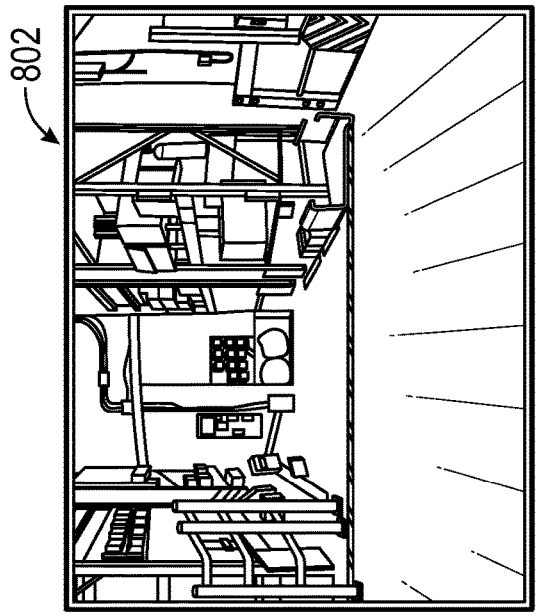
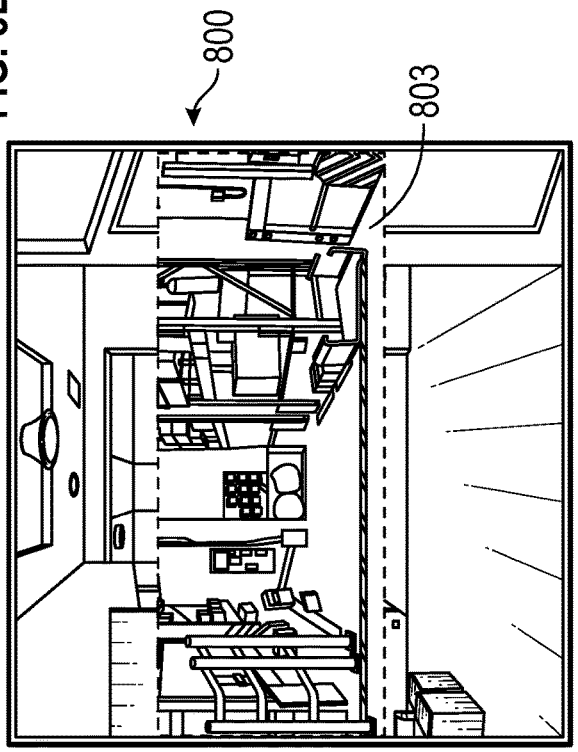
FIG. 8A
FIG. 8B
FIG. 8C

GENERATING GROUND TRUTH DATASETS FOR VIRTUAL REALITY EXPERIENCES

CROSS-REFERENCE TO RELATED APPLICATIONS

This application is a Continuation of U.S. application Ser. No. 17/342,851 filed Jun. 9, 2021, which claims priority to U.S. Provisional Application Ser. No. 63/046,150 filed on Jun. 30, 2020, the contents of both of which are incorporated fully herein by reference.

TECHNICAL FIELD

Examples set forth in the present disclosure relate to the field of virtual reality (VR). More particularly, but not by way of limitation, the present disclosure describes systems and methods of generating ground truth datasets that are useful for research and development of devices, for training machine-learning and computer-vision algorithms, and for producing VR experiences.

BACKGROUND

Many types of computers and electronic devices available today, such as mobile devices (e.g., smartphones, tablets, and laptops), and wearable devices (e.g., smart glasses, digital eyewear, headwear, headgear, and head-mounted displays), include a variety of cameras, sensors, wireless transceivers, input systems (e.g., touch-sensitive surfaces, pointers), peripheral devices, displays, and graphical user interfaces (GUIs) through which a user can interact with displayed content.

Virtual reality (VR) technology generates a complete virtual environment including realistic images, sometimes presented on a VR headset or other head-mounted display. VR experiences allow a user to move through the virtual environment and interact with virtual objects. Augmented reality (AR) is a type of VR technology that combines real objects in a physical environment with virtual objects and displays the combination to a user. The combined display gives the impression that the virtual objects are authentically present in the environment, especially when the virtual objects appear and behave like the real objects. Cross reality (XR) is generally understood as an umbrella term referring to systems that include or combine elements from AR, VR, and MR (mixed reality) systems.

Advanced VR technologies, such as computer vision and object tracking, may be used to produce a perceptually enriched and immersive experience. Computer vision algorithms extract three-dimensional data about the physical world from the data captured in digital images or video. Object recognition and tracking algorithms may be used to detect an object in a digital image or video, estimate its orientation or pose, and track its movement over time.

Software-as-a-service (SaaS) is a software access and delivery model in which software, applications, data, services, and other systems which are hosted on a remote server. Authorized users typically access the software through a web browser. A SaaS platform allows users to configure, run, test, and manage applications. The provider of a SaaS platform may provide servers, storage, operating systems, middleware, databases, access to datasets, and other services related to hosted applications.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 8A is an illustration of an example physical environment on a display, suitable for use with the ground truth dataset generation system of FIG. 4;

FIG. 8B is an illustration of an example virtual environment on a display, suitable for use with the ground truth dataset generation system of FIG. 4;

FIG. 8C is an illustration of an example composite view on a display, including a portion of the virtual environment of FIG. 8B presented as an overlay relative to the physical environment of FIG. 8A, suitable for use with the ground truth dataset generation system of FIG. 4;

DETAILED DESCRIPTION

Figure 1A:
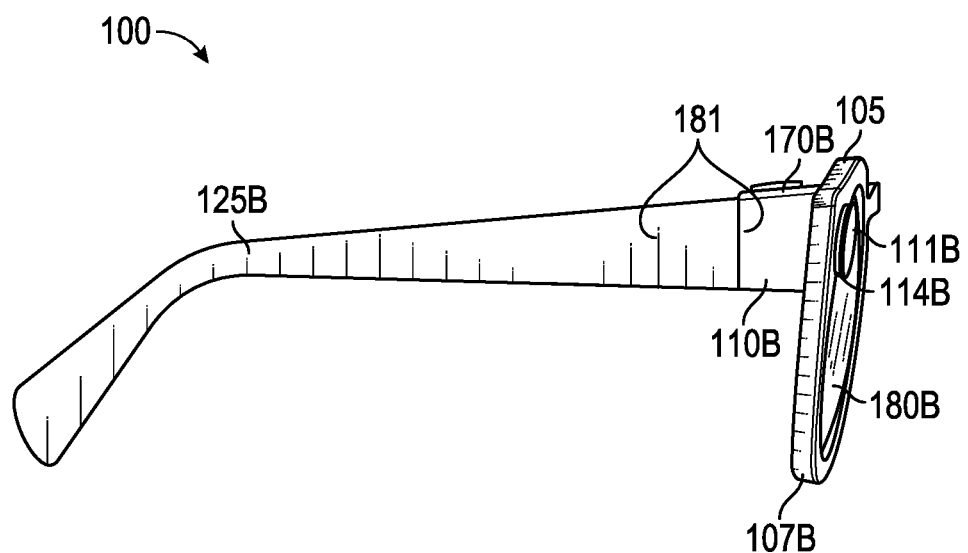
FIG. 1A is a side view (right) of an example hardware configuration of an eyewear device suitable for use in a ground truth dataset generation system.

Various implementations and details are described with reference to examples for generating ground truth datasets for assembling, configuring, testing, and developing headsets and related components for AR, VR, and XR experiences, or combinations thereof. For example, a first recording device with one or more cameras and one or more an inertial measurement units records images and real motion data along a path through a physical environment. A SLAM application calculates a headset trajectory based on the recorded data. A polynomial interpolation module generates a continuous time trajectory (CTT) function. A set of simulated sensors is assembled for use in a virtual environment. The CTT function is used to generate a ground truth output dataset that represents the assembled set of simulated sensors in motion through the virtual environment. Because the CTT function was generated using the real motion data, the output dataset produces a realistic and life-like VR experience. Moreover, this approach can be used to generate multiple output datasets, at various sample rates, which are useful for testing a variety of new or different sets of simulated sensors (e.g., as configured on new or different VR headsets).

An example method includes configuring a first recording device that includes one or more cameras and at least one inertial measurement unit (IMU). The method next includes recording a primary reference set, as captured by the first recording device in motion traversing a path through a physical environment. The primary reference set includes a series of real images captured by the camera and a series of real motion data captured by the IMU. A SLAM application uses the primary reference set to calculate a headset trajectory, which includes a sequence of camera poses. A polynomial interpolation module generates a continuous time trajectory (CTT) function that approximates the calculated headset trajectory and the series of real motion data. In some implementations, the CTT function is a Chebyshev polynomial function with one or more fitting coefficients.

The method includes identifying a first virtual environment and assembling a simulated sensor configuration (e.g., a simulated VR headset), which includes one or more simulated cameras and one or more simulated IMU sensors. Using the CTT function (which was generated to fit the real motion data), the method includes generating a ground truth output data set that represents the simulated sensor configuration in motion along a virtual path through the first virtual environment. The virtual path is closely correlated with the motion along the real path as captured by the first recording device.

The ground truth output dataset includes a series of virtual images (of the first virtual environment, based on poses calculated using the CTT function) and a series of simulated IMU data (also calculated using the CTT function). Because the CTT function was generated to fit the real motion data, the output dataset for the simulated sensor configuration is closely correlated with the real motion data that was captured by the first recording device.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the wearable or eyewear device, the client or mobile device, associated components and any other devices incorporating a camera, an inertial measurement unit (IMU), or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit (IMU) as constructed or as otherwise described herein.

In the context of this disclosure, virtual reality (VR) refers to and includes all types of systems that generate a simulated experience with virtual objects in any environment. For example, a virtual environment is generated as part of an immersive VR experience. An augmented reality (AR) experience includes virtual objects presented in a real, physical environment. In accordance with its ordinary meaning, virtual reality (VR) as used herein includes both VR and AR experiences. Accordingly, the terms VR and AR may be used interchangeably herein; the use of either term includes the other, unless the context clearly indicates otherwise.

In general, the concept of ground truth refers to information that is as close as possible to the objective truth. In the context of this disclosure, a ground truth dataset includes the data necessary to generate a VR experience. For example, a ground truth dataset includes the images, object locations, sounds, sensations, and other data associated with an environment, together with the movements, trajectories, positions, and visual orientations of the user within that environment.

Reality-based and authentic ground truth data produces a more vivid and convincing VR experience. Some VR systems use a dataset that is tailored to a user wearing a specific headset and moving through a specific environment along a few, limited trajectories. A trajectory describes the user's apparent movement through an environment and includes both the path taken and the apparent motion of the user. The apparent motion of the user, in some systems, may be limited to a small set of simple linear and angular motions, sometimes referred to as motion primitives. The result, in some cases, looks like a virtual camera moving smoothly along a path, which looks more like a flying aircraft or drone than a person walking or running. The apparent motion in many VR systems appears synthetic because the trajectory is artificially smooth.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Figure 4:
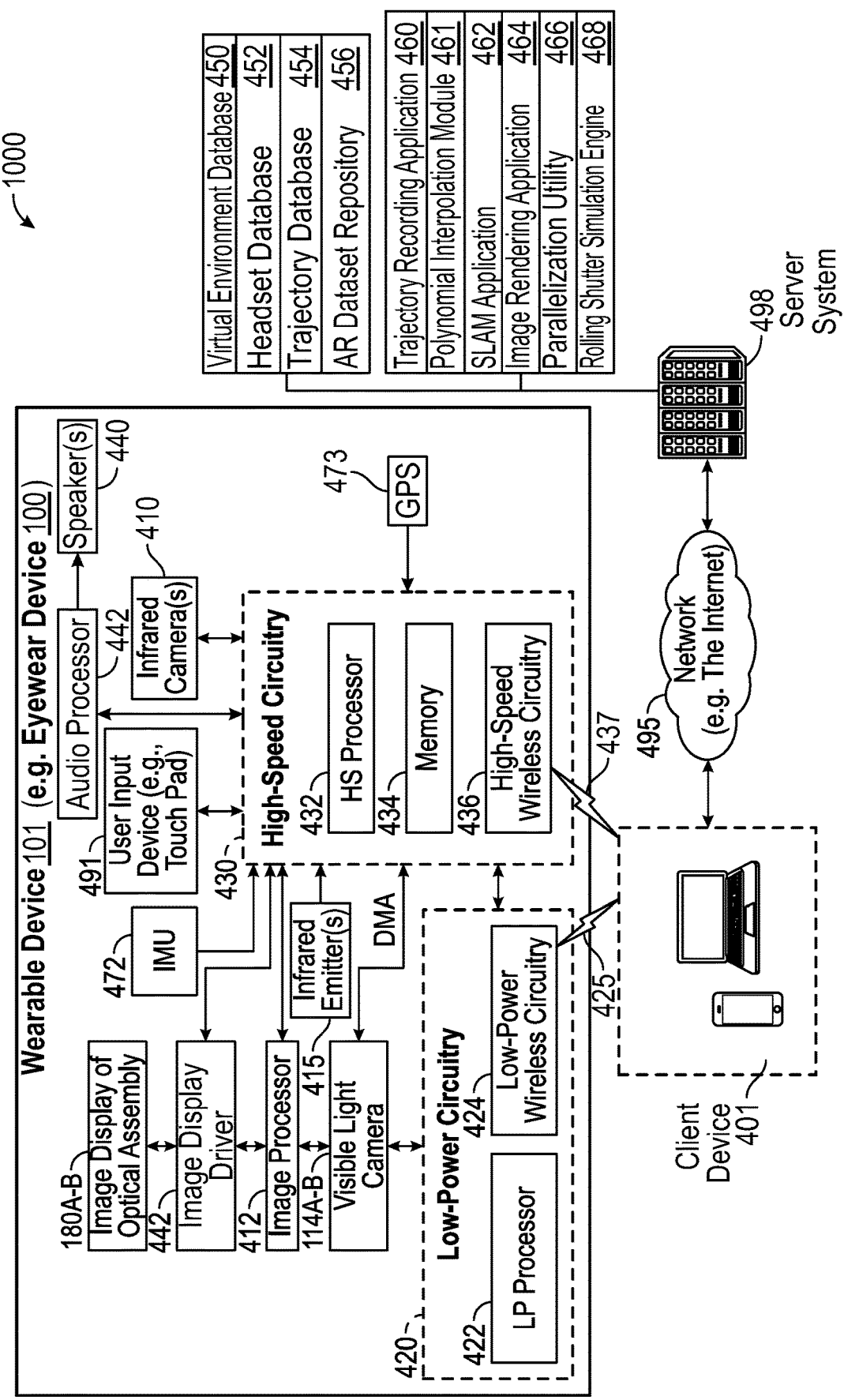
FIG. 4 is a functional block diagram of an example ground truth dataset generation system including a wearable device (e.g., a VR headset, an eyewear device), a client device, and a server system connected via various networks.

FIG. 4 is a functional block diagram of an example ground truth dataset generation system 1000 that includes a wearable device 101, a client device 410, and a server 498 connected via a network 495 such as the internet. The client device 401 may be any computing device, such a desktop computer or a mobile phone. As used herein, wearable device 101 includes any of a variety of devices having a display for use with VR systems, such as head-mounted displays, VR headsets, and the eyewear device 100 described herein. Although the features and functions of a wearable device 101 are described herein with reference to the eyewear device 100, such features and functions may be present on any type of wearable device 101 suitable for use with VR systems.

FIG. 1A is a side view (right) of an example hardware configuration of a wearable device 101 in the form of an eyewear device 100, which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
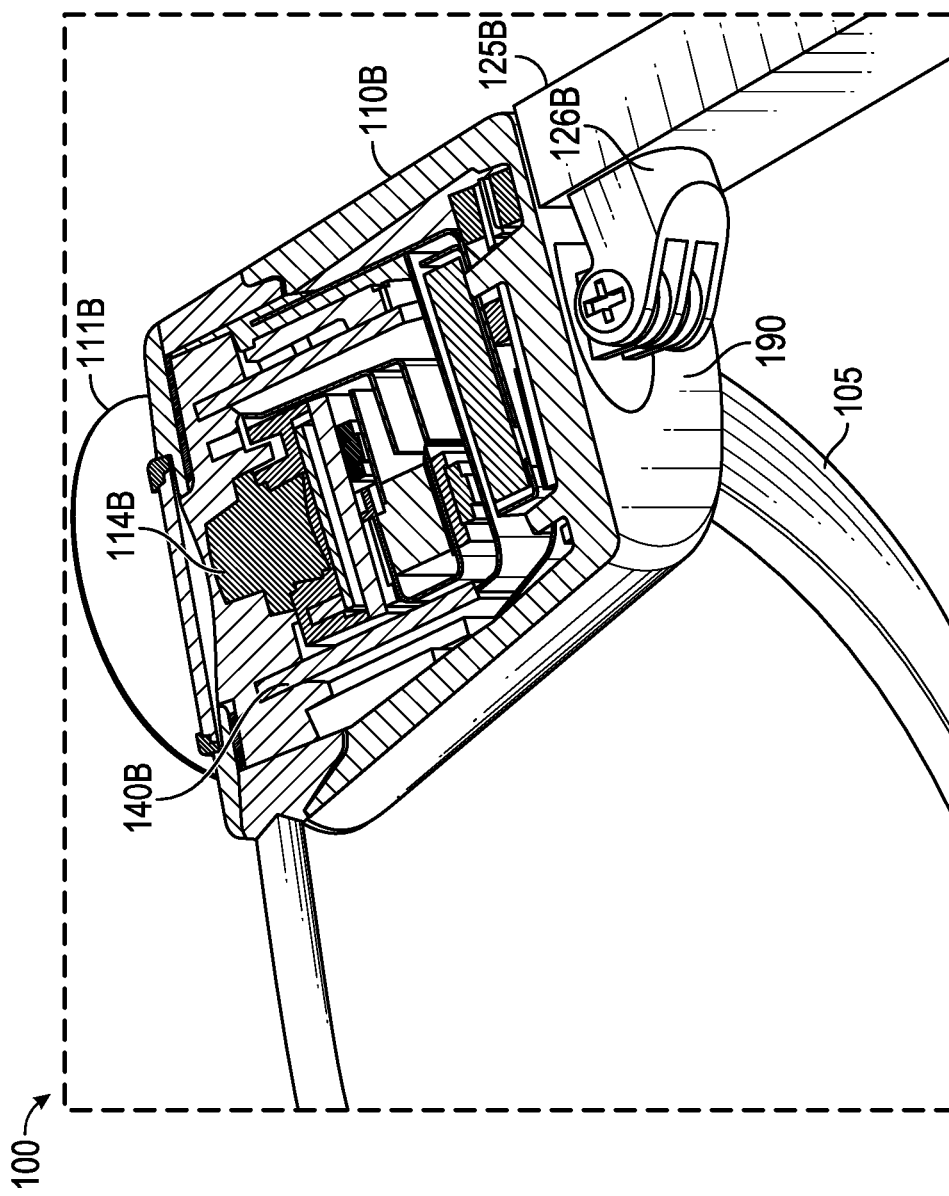
FIG. 1B is a perspective, partly sectional view of a right corner of the eyewear device of FIG. 1A depicting a right visible-light camera, and a circuit board.
Figure 1C:
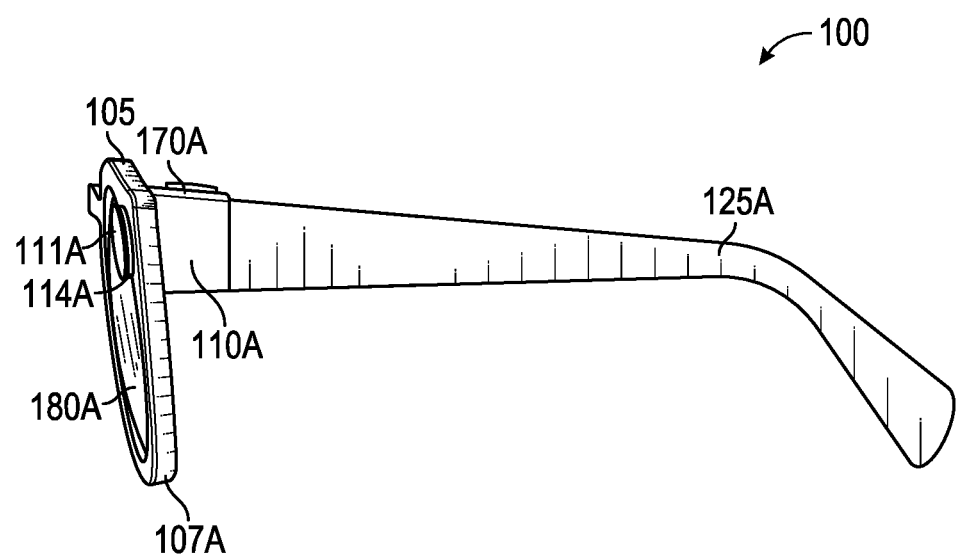
FIG. 1C is a side view (left) of an example hardware configuration of the eyewear device of FIG. 1A, which shows a left visible-light camera.
Figure 1D:
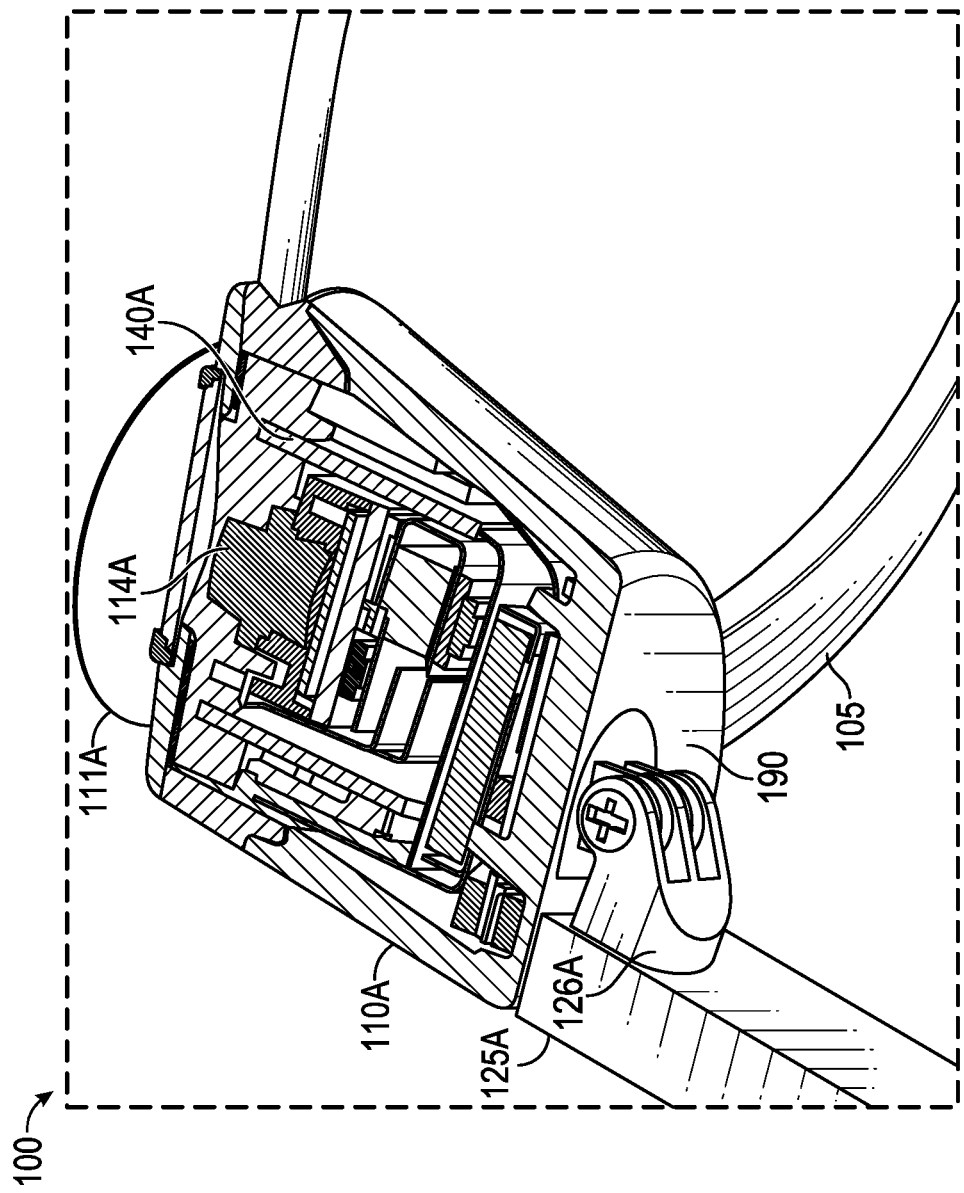
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
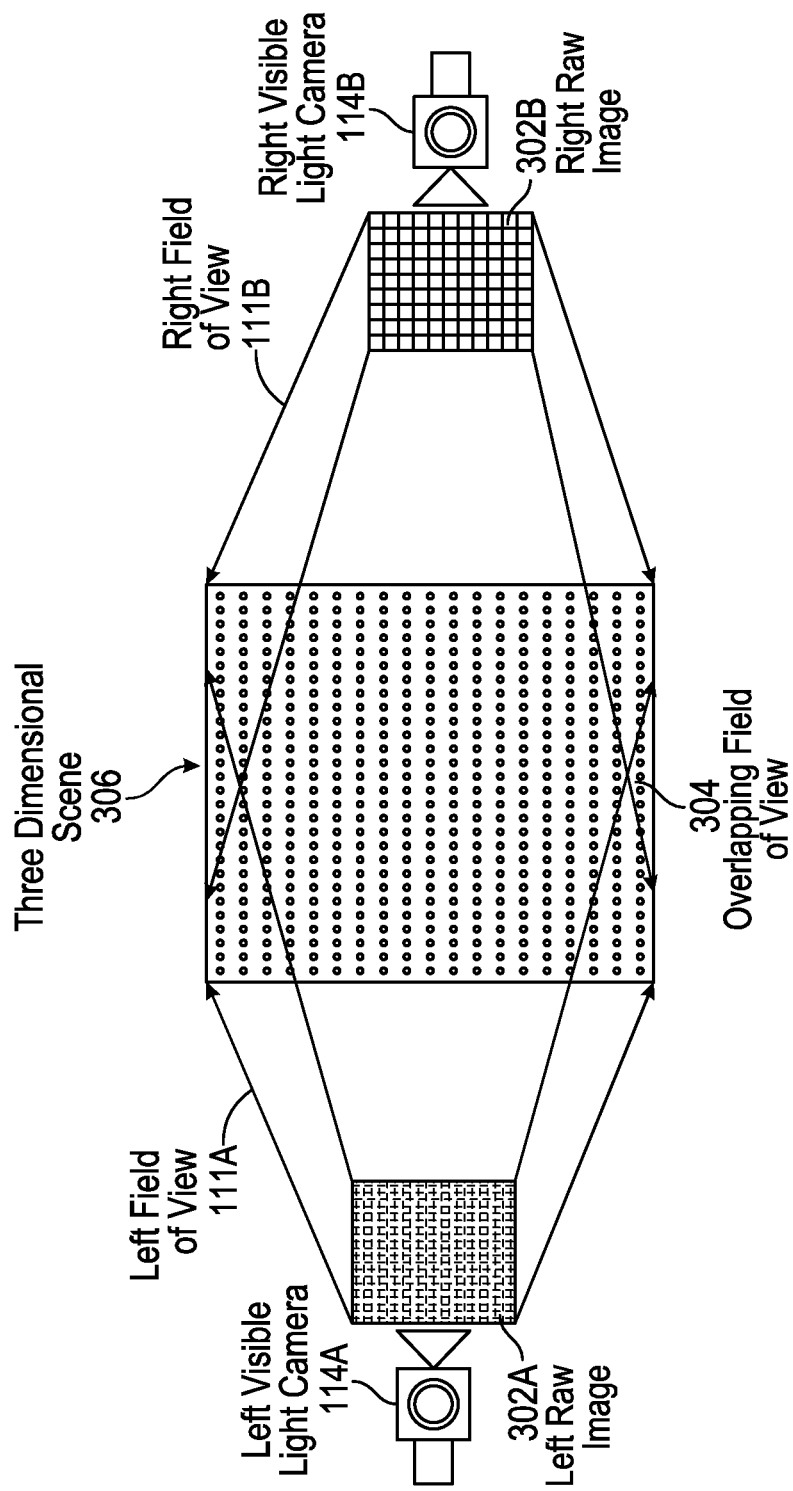
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both visible-light cameras 114A, 114B has a field of view of 100° and a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640p (e.g., 640×480 pixels for a total of 0.3 megapixels), 720p, or 1080p. Other examples of visible-light cameras 114A, 114B that can capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) experiences and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). The right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via Wi-Fi).

Figure 2A:
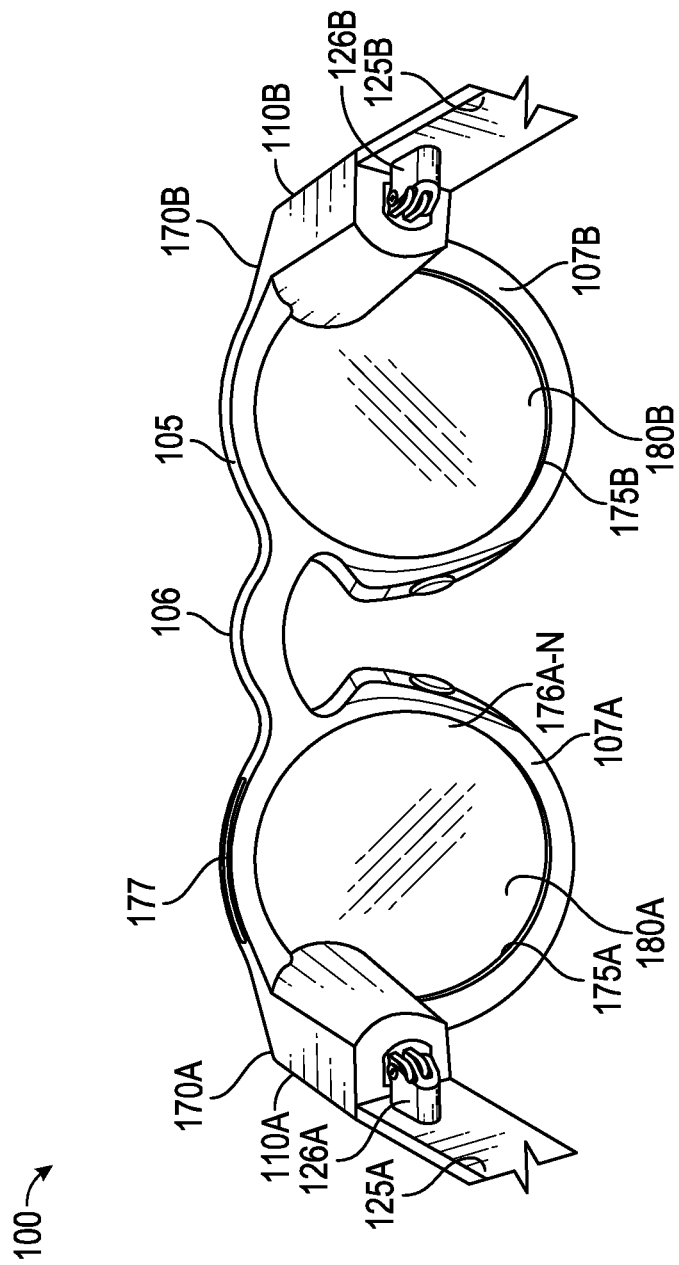
FIGS. 2A and 2B are rear views of example hardware configurations of an eyewear device utilized in the ground truth dataset generation system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
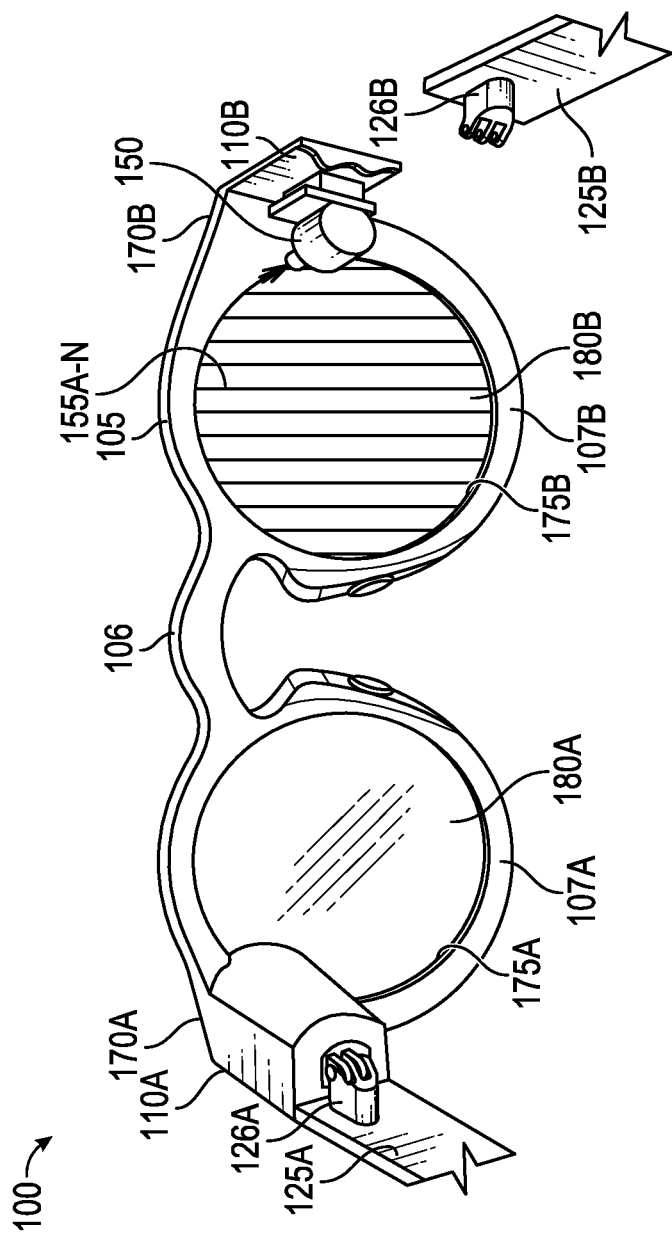

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may be incorporated into any other wearable device 101, such as an VR headset or helmet, a head-mounted display, or another device suitable for use with VR systems.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector (not shown) and a right projector 150. The left optical assembly 180A may include a left display matrix 177A or a left set of optical strips (not shown), which are configured to interact with light from the left projector. Similarly, the right optical assembly 180B may include a right display matrix (not shown) or a right set of optical strips 155A, 155B, . . . 155N, which are configured to interact with light from the right projector 150. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a client device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the ground truth dataset generation system 1000 (FIG. 4) includes a wearable device 101, such as the eyewear device 100 described herein, which includes a frame 105 and a left temple 110A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 110A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

FIG. 4 is a functional block diagram of an example ground truth dataset generation system 1000 that includes a wearable device 101 (e.g., an AR headset or eyewear device 100), a client device 401 (e.g., desktop computer or mobile phone), and a server system 498 connected via various networks 495 such as the Internet. The ground truth dataset generation system 1000 includes a low-power wireless connection 425 and a high-speed wireless connection 437 between the eyewear device 100 and the client device 401. The client device 401 may be any computing device, such a desktop computer or a mobile phone. As used herein, wearable device 101 includes any of a variety of devices having a display for use with VR systems, such as head-mounted displays, VR headsets, and the eyewear device 100 described herein. Although the features and functions of a wearable device 101 are described herein with reference to the eyewear device 100, such features and functions may be present on any type of wearable device 101 suitable for use with VR systems.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The eyewear device 100 additionally includes one or more speakers 440 (e.g., one associated with the left side of the eyewear device and another associated with the right side of the eyewear device). The speakers 440 may be incorporated into the frame 105, temples 125, or corners 110 of the eyewear device 100. The one or more speakers 440 are driven by audio processor 443 under control of low-power circuitry 420, high-speed circuitry 430, or both. The speakers 440 are for presenting audio signals including, for example, a beat track. The audio processor 443 is coupled to the speakers 440 in order to control the presentation of sound.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). The client device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
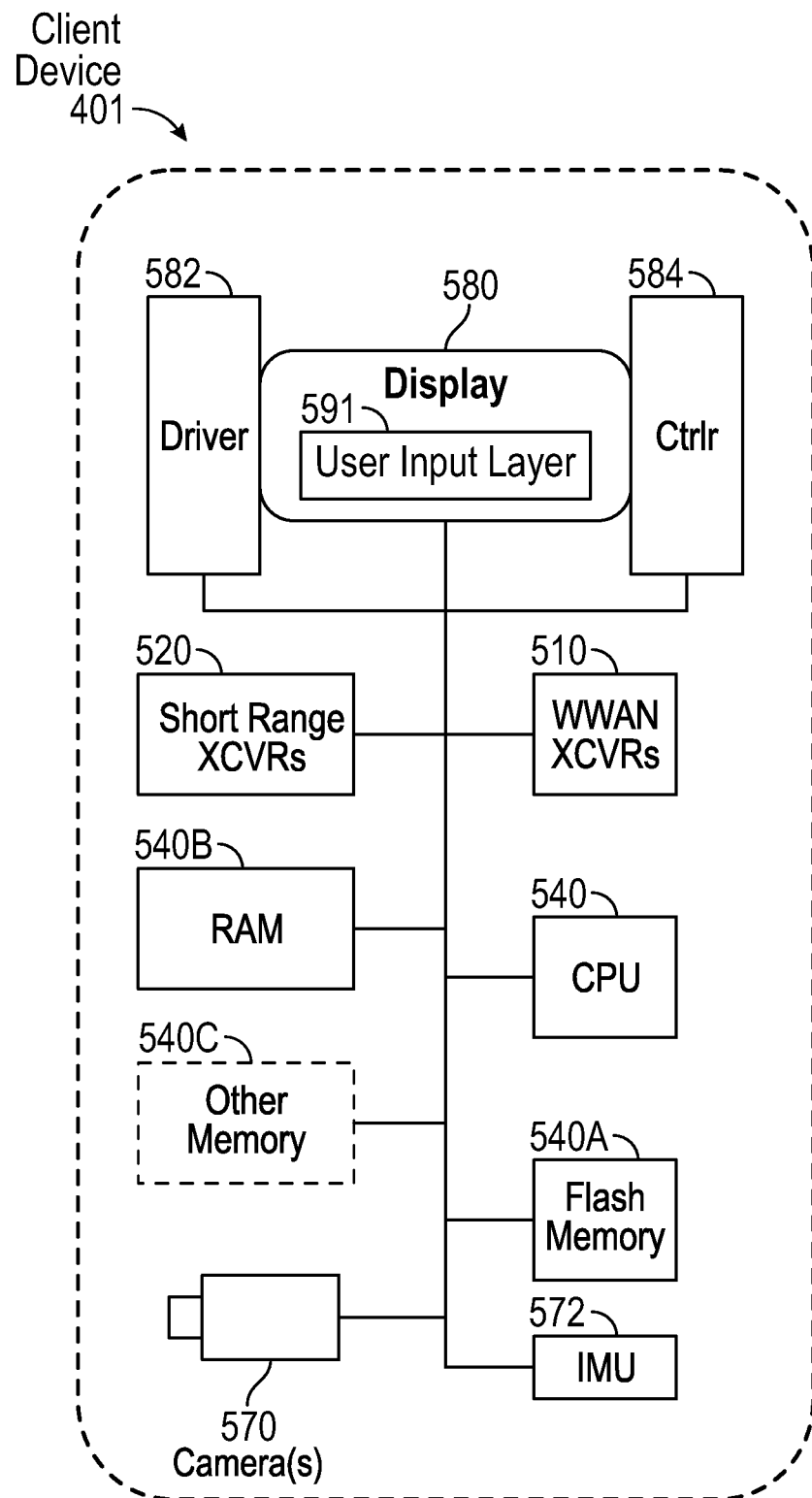
FIG. 5 is a diagrammatic representation of an example hardware configuration for a client device of the ground truth dataset generation system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 540 of the client device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with a client device and a wearable device 101, such as the eyewear device 100 described herein.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The client device 401 and the server system 498 may include alphanumeric, pointer-based, tactile, audio, and other input components.

In some examples, the eyewear device 100 includes a collection of motion-sensing components referred to as an inertial measurement unit (IMU) 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors. Such positioning system coordinates can also be received over the wireless connections 425, 437 from the client device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The client device 401 may be a desktop computer, laptop computer, mobile device, smartphone, tablet, laptop computer, access point, or any other such device capable of connecting with eyewear device 100 using both a low-power wireless connection 425 and a high-speed wireless connection 437. The client device 401 is connected to server system 498 and network 495. The network 495 may include any combination of wired and wireless connections.

The ground truth dataset generation system 1000, as shown in FIG. 4, includes a client device 401, such as a desktop computer or mobile device, coupled to a wearable device 101 over a network 495. The ground truth dataset generation system 1000 includes a number of memory elements for storing instructions and processor elements for executing those instructions. Execution of the instructions associated with the ground truth dataset generation system 1000 by the processor 432 configures the wearable device 101 (e.g., eyewear device 100) to cooperate with the client device 401. The ground truth dataset generation system 1000 may utilize the memory 434 of the eyewear device 100 or the memory elements 540A, 540B, 540C of the client device 401 (FIG. 5). Also, the ground truth dataset generation system 1000 may utilize the processor elements 432, 422 of the wearable or eyewear device 100 or the central processing unit (CPU) 540 of the client device 401 (FIG. 5). In addition, the ground truth dataset generation system 1000 may further utilize the memory and processor elements of the server system 498, as described herein. In this aspect, the memory and processing functions of the ground truth dataset generation system 1000 can be shared or distributed across the wearable device 101 or eyewear device 100, the client device 401, and the server system 498.

Figure 12:
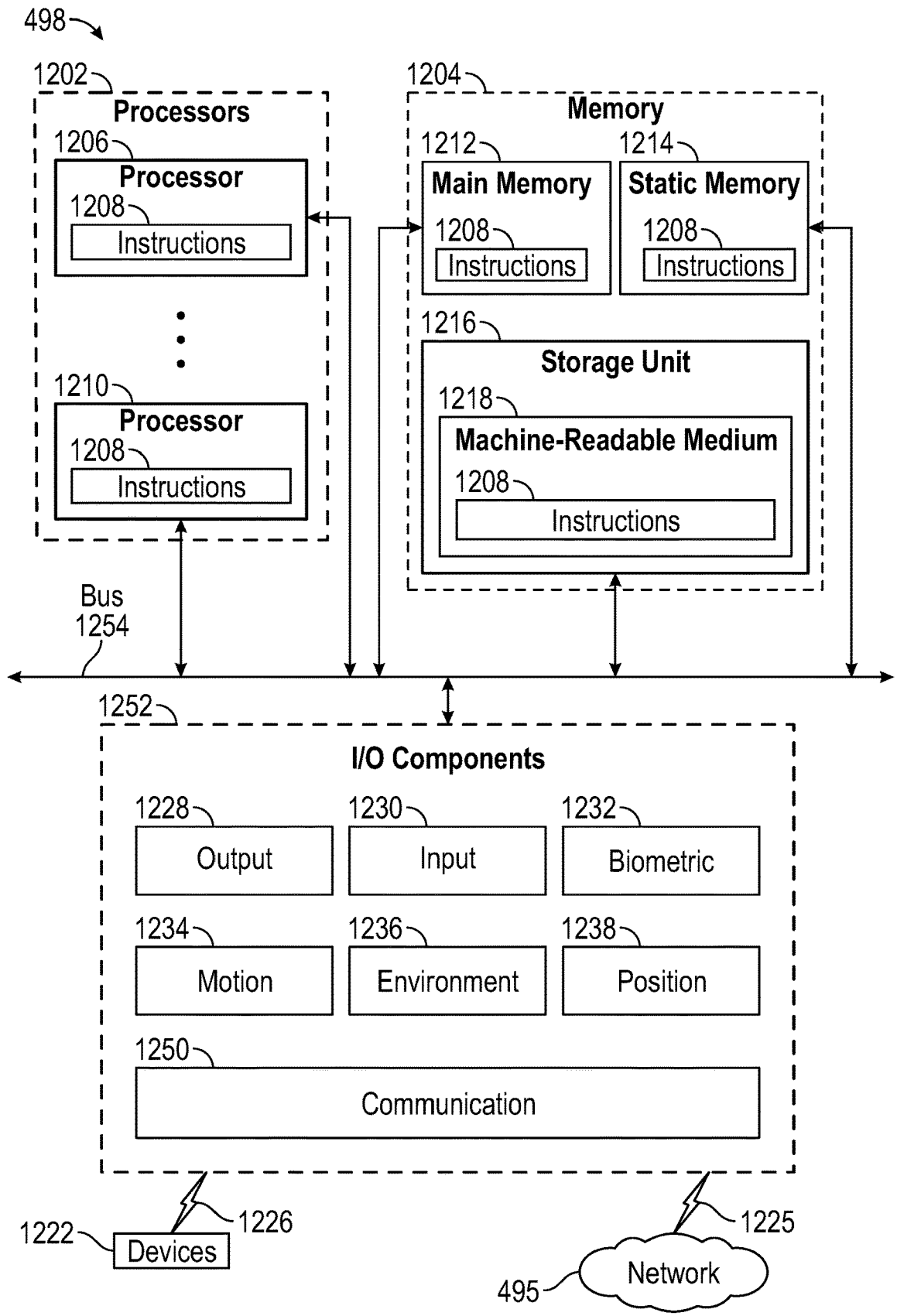
FIG. 12 is a diagrammatic representation of an example server.

FIG. 12 is a diagrammatic representation of the an example server system 498 within which instructions 1208 (e.g., software, a program, an application, an applet, an app, or other executable code) for causing the server system 498 to perform any one or more of the methodologies discussed herein may be executed. For example, the instructions 1208 may cause the server system 498 to execute any one or more of the methods described herein. The instructions 1208 transform the general, non-programmed server system 498 into a particular server system 498 programmed to carry out the described and illustrated functions in the manner described. The server system 498 may operate as a stand-alone device or may be coupled (e.g., networked) to other machines. In a networked deployment, the server system 498 may operate in the capacity of a server machine or a client machine in a server-client network environment, or as a peer machine in a peer-to-peer (or distributed) network environment. The server system 498 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the server system 498. Further, while only a single server system 498 is illustrated, the term "server" shall also be taken to include a collection of machines that individually or jointly execute the instructions 1208 to perform any one or more of the methodologies discussed herein.

The server system 498 may include server processors 1202, server memory elements 1204, and I/O components 1252, which may be configured to communicate with each other via a bus 1254. In an example, the processors 1202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 5 shows multiple processors 1202, the server system 498 may include a single processor with a single core, a single processor with multiple cores (e.g., a multi-core processor), multiple processors with a single core, multiple processors with multiples cores, or any combination thereof.

The server memory 1204 includes a main memory 1212, a static memory 1214, and a storage unit 1216, both accessible to the processors 1202 via the bus 1254. The main server memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 (e.g., a non-transitory machine-readable storage medium) within the storage unit 1216, within at least one of the processors 1202 (e.g., within the processor's cache memory), or any suitable combination thereof, during execution thereof by the server system 498.

Furthermore, the machine-readable medium 1218 is non-transitory (in other words, not having any transitory signals) in that it does not embody a propagating signal. However, labeling the machine-readable medium 1218 "non-transitory" should not be construed to mean that the medium is incapable of movement; the medium should be considered as being transportable from one physical location to another. Additionally, since the machine-readable medium 1218 is tangible, the medium may be a machine-readable device.

The I/O components 1252 may include a wide variety of components to receive input, provide output, produce output, transmit information, exchange information, capture measurements, and so on. The specific I/O components 1252 that are included in a particular machine will depend on the type of machine. For example, portable machines such as mobile phones may include a touch input device or other such input mechanisms, while a headless server machine will likely not include such a touch input device. It will be appreciated that the I/O components 1252 may include many other components that are not shown in FIG. 5. In various examples, the I/O components 1252 may include output components 1228 and input components 1230. The output components 1228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, a resistance feedback mechanism), other signal generators, and so forth. The input components 1230 may include alphanumeric input components (e.g., a keyboard, a touch screen configured to receive alphanumeric input, a photo-optical keyboard, or other alphanumeric input components), pointing-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 1252 may include biometric components 1232, motion components 1234, environmental components 1236, or position components 1238, among a wide array of other components. For example, the biometric components 1232 include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 include acceleration sensor components (e.g., accelerometer), gravitation sensor components, rotation sensor components (e.g., gyroscope), and so forth. The environmental components 1236 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1252 further include communication components 1250 operable to couple the server system 498 to a network 495 via a coupling 1225, or to one or more remote devices 1222 via a coupling 1226. For example, the communication components 1250 may include a network interface component or another suitable device to interface with the network 495. In further examples, the communication components 1250 may include wired communication components, wireless communication components, cellular communication components, Near-field Communication (NFC) components, Bluetooth® components (e.g., Bluetooth® Low Energy), Wi-Fi® components, and other communication components to provide communication via other modalities. The devices 1222 may be another machine, such as a client device 401 described herein, or any of a wide variety of peripheral devices (e.g., a peripheral device coupled via a USB).

Moreover, the communication components 1250 may detect identifiers or include components operable to detect identifiers. For example, the communication components 1250 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1250, such as location via Internet Protocol (IP) geolocation, location via Wi-Fi® signal triangulation, location via detecting an NFC beacon signal that may indicate a particular location, and so forth.

The various memories (e.g., server memory 1204, main memory 1212, static memory 1214, memory of the processors 1202), storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed examples.

The instructions 1208 may be transmitted or received over the network 495, using a transmission medium, via a network interface device (e.g., a network interface component included in the communication components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

As illustrated in FIG. 4, in some example implementations, the server memory 1204 of the server system 498 is coupled to one or more databases, including a virtual environment database 450, a headset database 452, a trajectory database 454, and an AR dataset repository 456. These databases in some implementations are also accessible by and sometimes stored locally on the wearable device 101 (e.g., eyewear device 100) and/or on a client device 401, as described herein.

The virtual environment database 450 stores data about a variety of virtual environments, many of which are available for use and accessible through websites known as virtual environment marketplaces. The headset database 452 stores data about a variety of commercially available wearable devices 101 suitable for use with VR systems, together with data about the array of sensors (i.e., intrinsic sensors) which are incorporated into or otherwise provided with such wearable devices 101. The headset database 452 in some implementations also includes discrete data files about non-intrinsic or additional sensors, cameras, inertial measurement units (IMUs), and other sensors (i.e., extrinsic sensors) which, if selected, may be used with such wearable devices 101. The trajectory database 454 stores data about a variety of pre-recorded trajectories suitable for use with AR systems.

The ground truth dataset generation system 1000, in some implementations, includes a number of virtual machines (VMs) to distribute the applications, data, and tasks to be completed. The system 1000 may generate, access, and control a number of managed agents and schedulers assigned to complete certain tasks. Results may be collected and stored in one or more virtual buckets or in folders accessible by the user. The user can specify the type of output format best suited for their particular use. Completed AR datasets are stored in the AR dataset repository 456.

The server 498 is coupled to one or more applications including a trajectory recording application 460, a polynomial interpolation module 461, a SLAM application 462, an image rendering application 464, a parallelization utility 466, and a rolling shutter simulation engine 468. These applications in some implementations are accessible by and sometimes stored locally on a client device 401 or a wearable device 101, as described herein.

The trajectory recording application 460 allows a user to record their own trajectory by, for example, donning a first recording device 726 (e.g., the eyewear device 100 as described herein) and moving through a physical environment while the first recording device 726 captures the data needed to generate trajectory data, for use with the dataset generation system 1000 described herein.

In some implementations, the polynomial interpolation module 461 generates a continuous time trajectory (CTT) function 640, as described herein, for interpolating the trajectory data. The CTT function generates a single curve that approximates the headset trajectory and the real motion data captured by the first recording device 726.

The SLAM application 462 processes the raw data captured by the trajectory recording application 460. The image rendering application 464, in some example implementations, selects and processes the visual images for presentation on a display. The available visual images are typically part of a virtual environment file, which is stored in the virtual environment database 450. The parallelization utility 466 parses data into subsets called splits which are processed in parallel to reduce processing time. The rolling shutter simulation engine 468 in some implementations processes one or more images to simulate a rolling shutter effect which, if selected, is applied to sequences of video images.

FIG. 5 is a high-level functional block diagram of an example client device 401. The client device 401 includes a flash memory 540A which stores programming to be executed by the CPU 540 to perform all or a subset of the functions described herein. The client device 401 in some implementations is a mobile device such as a smartphone.

The client device 401 may include a camera 570 that comprises at least two visible-light cameras (first and second visible-light cameras with overlapping fields of view) or at least one visible-light camera and a depth sensor with substantially overlapping fields of view. The flash memory 540A may further include stored images and video, as captured by the camera 570.

As shown, the client device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Any type of client device 401 may include a touchscreen. The structure and operation of the touchscreen-type devices is provided by way of example; the subject technology as described herein is not intended to be limited thereto. For purposes of this discussion, FIG. 5 therefore provides a block diagram illustration of the example client device 401 with a user interface that includes a touchscreen input layer 591 for receiving input (by touch, multi-touch, or gesture, and the like, by hand, stylus or other tool) and an image display 580 for displaying content As shown in FIG. 5, the client device 401 includes at least one digital transceiver (XCVR) 510, shown as WWAN XCVRs, for digital wireless communications via a wide-area wireless mobile communication network. The client device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the client device 401, the client device 401 can include a global positioning system (GPS) receiver. Alternatively, or additionally the client device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device 100 over one or more network connections via XCVRs 510, 520.

The client device 401 in some examples includes a collection of motion-sensing components referred to as an inertial measurement unit (IMU) 572 for sensing the position, orientation, and motion of the client device 401. The motion-sensing components may be micro-electro-mechanical systems (MEMS) with microscopic moving parts, often small enough to be part of a microchip. The inertial measurement unit (IMU) 572 in some example configurations includes an accelerometer, a gyroscope, and a magnetometer. The accelerometer senses the linear acceleration of the client device 401 (including the acceleration due to gravity) relative to three orthogonal axes (x, y, z). The gyroscope senses the angular velocity of the client device 401 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the client device 401 relative to magnetic north.

The IMU 572 may include or cooperate with a digital motion processor or programming that gathers the raw data from the components and compute a number of useful values about the position, orientation, and motion of the client device 401. For example, the acceleration data gathered from the accelerometer can be integrated to obtain the velocity relative to each axis (x, y, z); and integrated again to obtain the position of the client device 401 (in linear coordinates, x, y, and z). The angular velocity data from the gyroscope can be integrated to obtain the position of the client device 401 (in spherical coordinates). The programming for computing these useful values may be stored in on or more memory elements 540A, 540B, 540C and executed by the CPU 540 of the client device 401.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of message communications to/from the client device 401.

The client device 401 further includes a microprocessor that functions as a central processing unit (CPU); shown as CPU 540 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 540, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 540 or processor hardware in smartphone, laptop computer, and tablet.

The CPU 540 serves as a programmable host controller for the client device 401 by configuring the client device 401 to perform various operations, for example, in accordance with instructions or programming executable by CPU 540. For example, such operations may include various general operations of the client device, as well as operations related to the programming for applications on the device. Although a processor may be configured by use of hardwired logic, typical processors in client devices are general processing circuits configured by execution of programming.

The client device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 540, e.g., as a working data processing memory. The flash memory 540A typically provides longer-term storage.

Hence, in the example of client device 401, the flash memory 540A is used to store programming or instructions for execution by the CPU 540. Depending on the type of device, the client device 401 may run a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. In the context of VR and AR systems, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection.

Sensor data includes images received from one or both of the cameras 114A, 114B, distance(s) received from a laser range finder, position information received from a GPS unit 473, or a combination of two or more of such sensor data, or from other sensors providing data useful in determining positional information.

Figure 6:
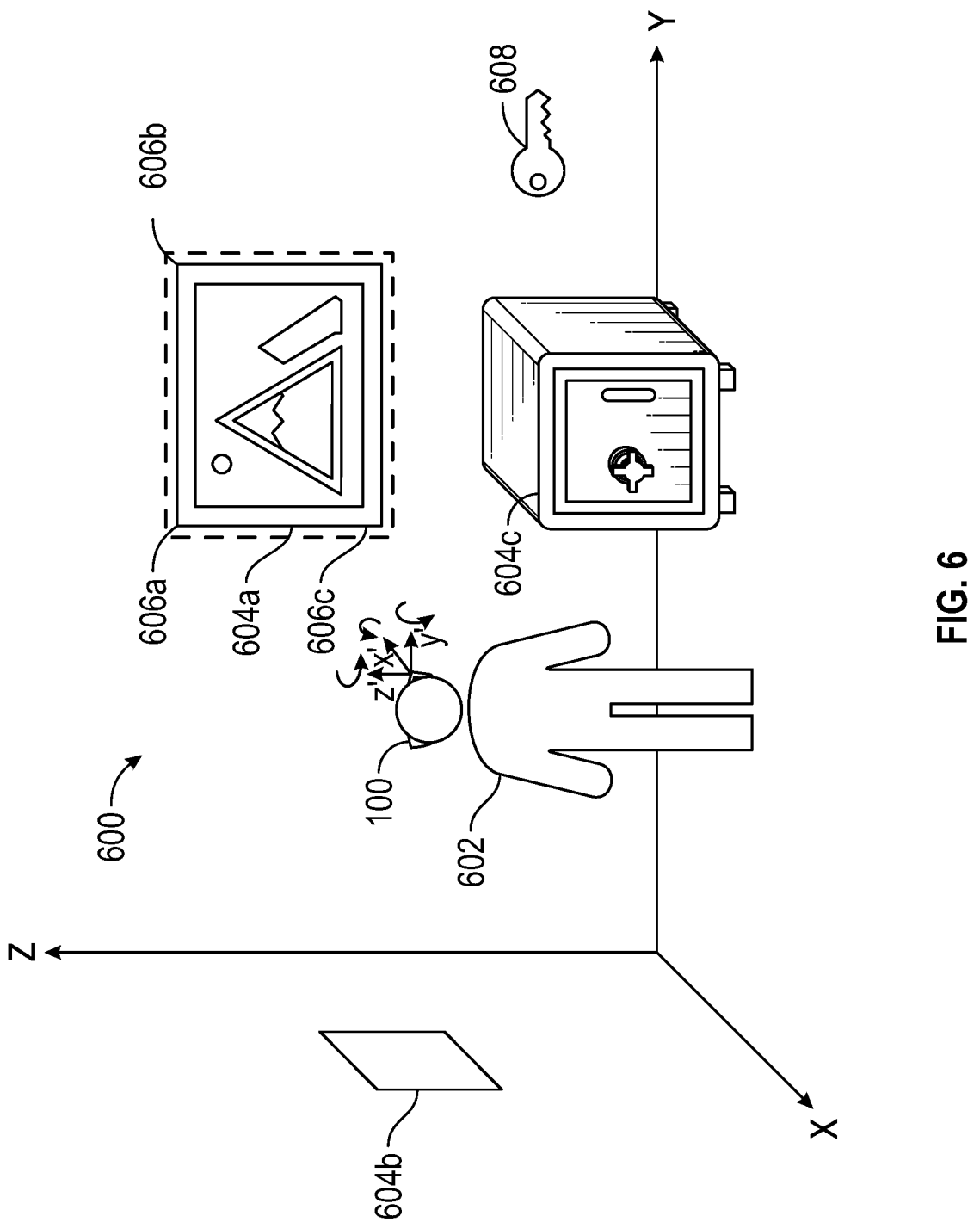
FIG. 6 is a schematic illustration of a user in an example environment for use in describing simultaneous localization and mapping.

FIG. 6 depicts an example physical environment 600 along with elements that are useful when using a SLAM application 462, as described herein, and other tracking applications (e.g., natural feature tracking (NFT)). A user 602 of a wearable device 101, such as the eyewear device 100 described herein, is present in an example physical environment 600 (which, in FIG. 6, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (roll, pitch, and yaw) of the eyewear device 100 within the environment by using two or more location points (e.g., three location points 606a, 606b, and 606c) associated with a single object 604a, or by using one or more location points 606 associated with two or more objects 604a, 604b, 604c. The processor 432 of the eyewear device 100 may position and display a virtual object (such as the key 608 shown in FIG. 6) within a physical environment 600 for viewing during an augmented reality (AR) experience. Similarly, the processor 432 of the eyewear device 100 may position and display virtual objects with a virtual environment, relative to the user, for viewing during an immersive VR experience.

Figure 7:
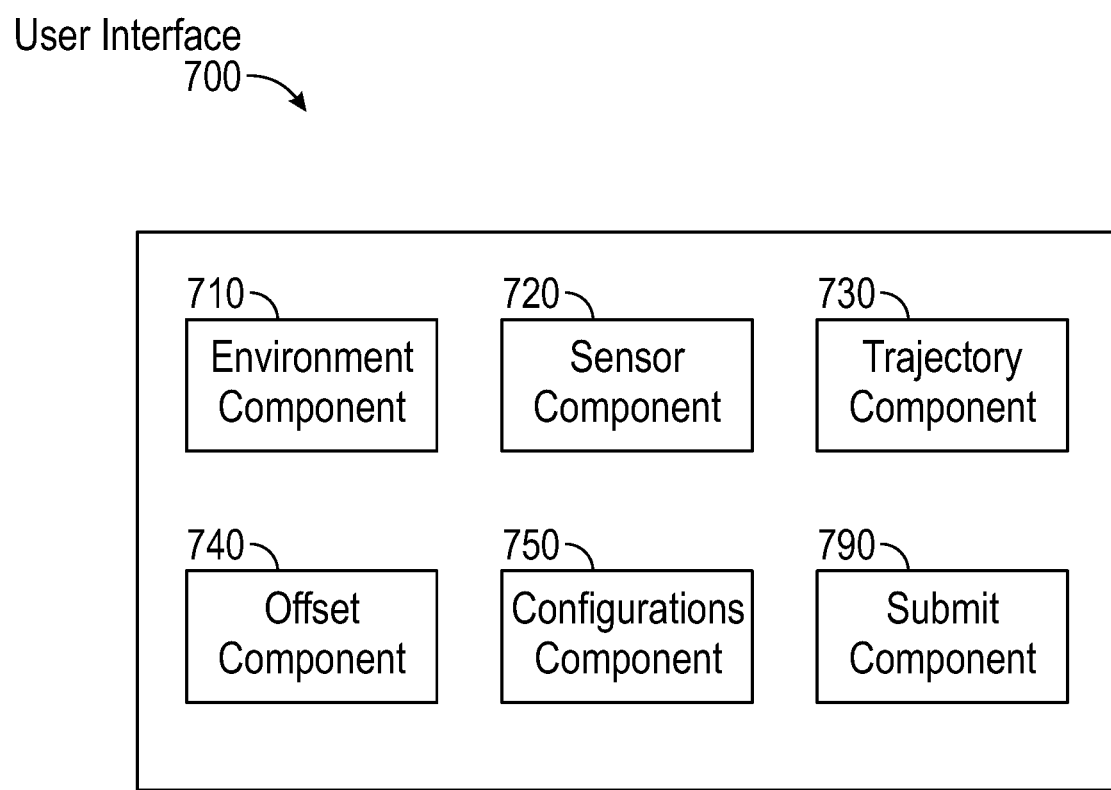
FIG. 7 is a schematic illustration of an example user interface with selectable components, suitable for use with the ground truth dataset generation system of FIG. 4.

FIG. 7 is a schematic illustration of an example user interface 700 including a number of selectable components, suitable for use with the ground truth dataset generation system 1000 described herein. The user interface 700 in some implementations is presented on the display 580 of a client device 401 of a user accessing a server 498. In this aspect, the system 1000 maybe be accessed and delivered using a SaaS model. As shown, the user interface 700 includes an environment component 710, a sensor component 720, a trajectory component 730, an offset component 740, a configurations component 750, and a submit component 790.

For the ground truth dataset generation system 1000 described herein, the selections of a virtual environment, a headset, a sensor configuration, and a trajectory are independent of the other selections. In other words, the selections are persistent; changing one selection will not change the other selections. Any combination of selections may be submitted for processing. In this aspect, the ground truth dataset established according to the combination of selections is de-coupled from any particular selection. The term selecting as used herein refers to and includes the process of selecting, configuring, identifying, assembling, and the like which may be performed by a person such as an authorized user or by any element of the described systems which are configured to execute a selection. Accordingly, use of the term selecting to describe an example process may or may not include action by a person.

Figure 7A:
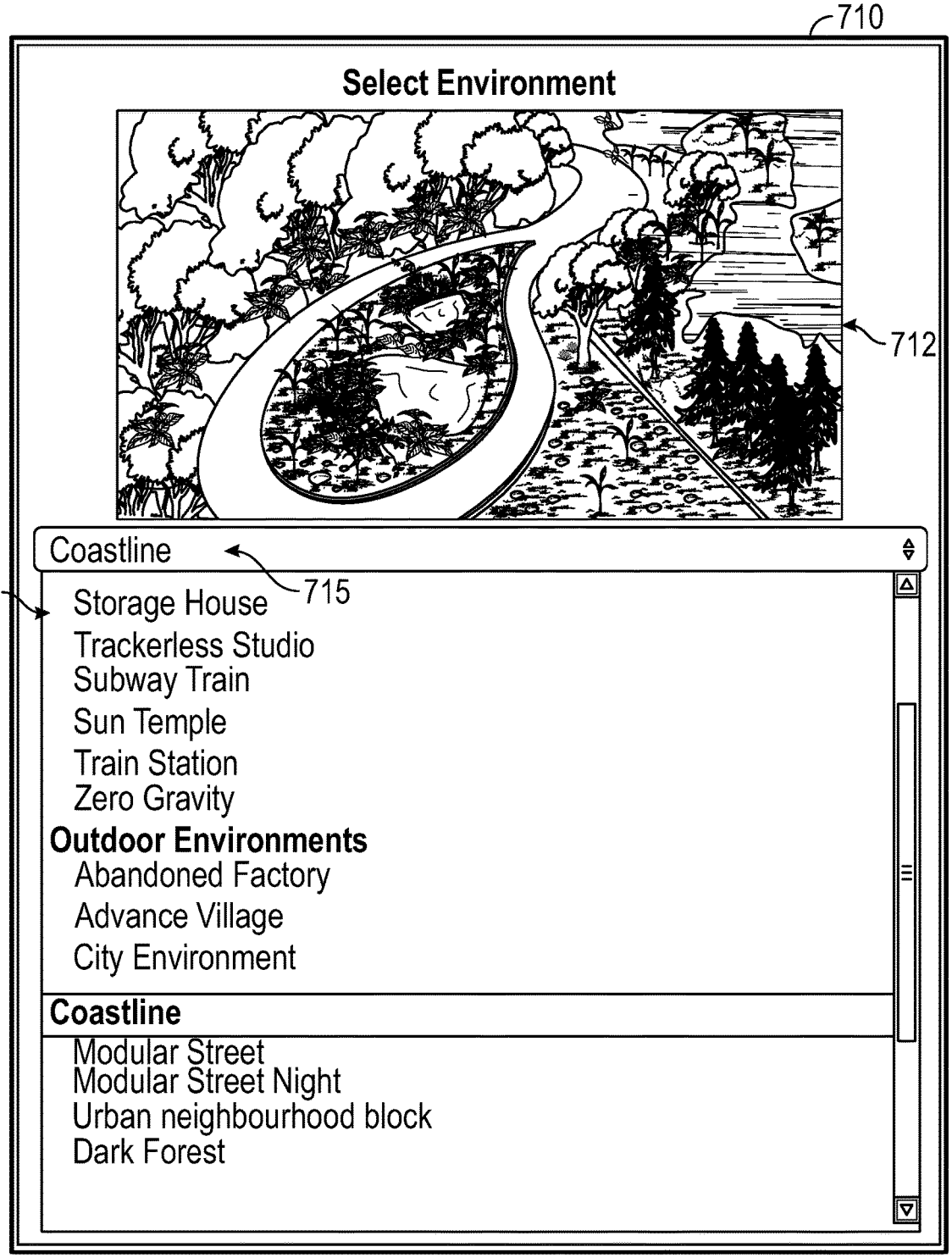
FIG. 7A is an illustration of an example environment component of the user interface of FIG. 7.

FIG. 7A is an illustration of an example environment component 710, which provides an interface through which a user can select a virtual environment 715 from a list 711 of virtual environments which are stored in the virtual environment database 450 described herein. The list 711 may be presented as a drop-down menu, as shown, including a slider and other related features typically provided with menu interfaces. In some example implementations, the environment component 710 displays a sample image 712 comprising a representative scene from the selected virtual environment 715.

In the context of this disclosure, selecting a component (e.g., a virtual environment, a headset, a sensor, a sensor configuration, a trajectory) refers to an includes selecting one or more files, records, data stores, applications, subroutines, or other elements associated with the selected component.

Figure 7B:
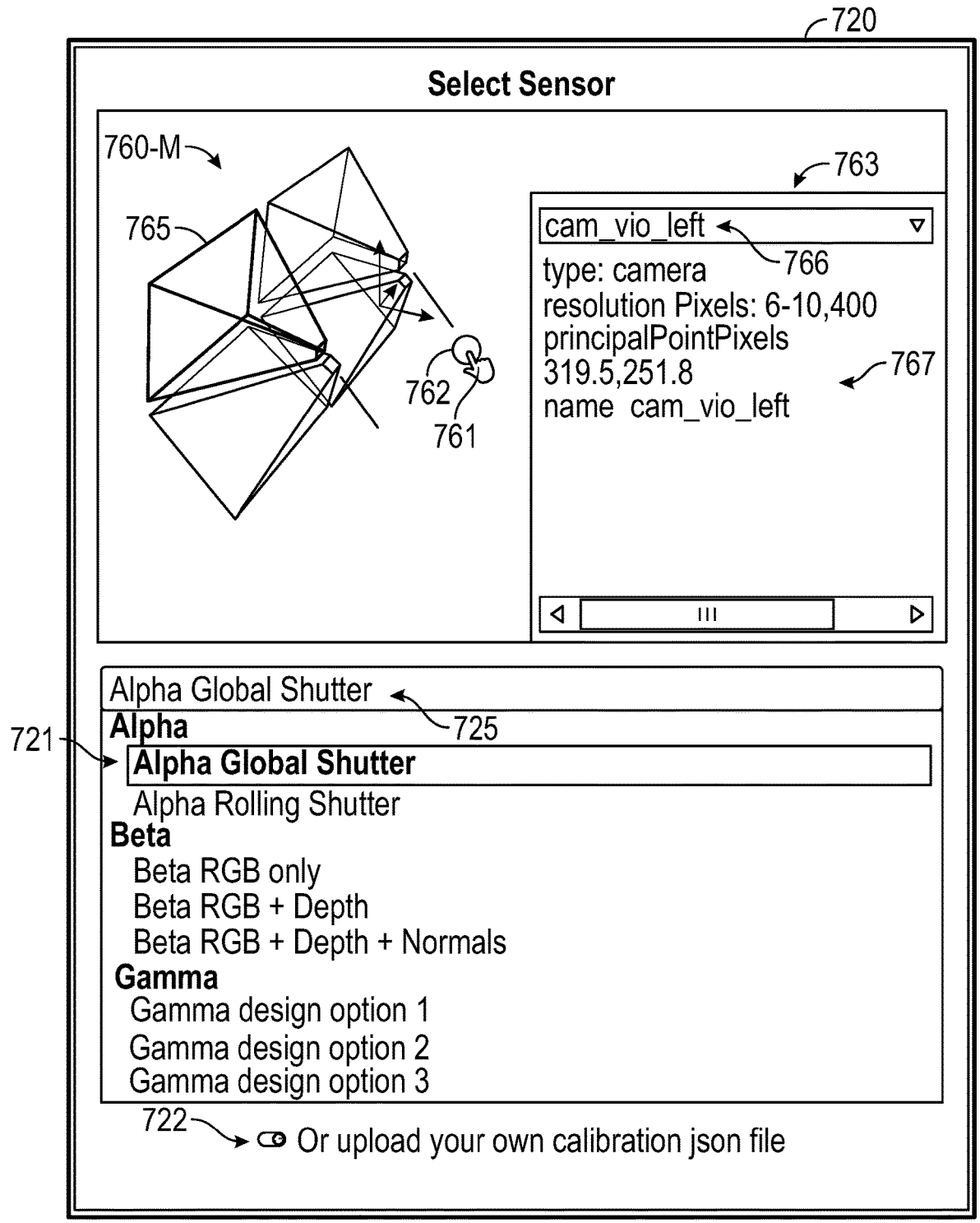
FIG. 7B is an illustration of an example sensor component of the user interface of FIG. 7.

FIG. 7B is an illustration of an example sensor component 720 of the user interface 700, which provides an interface through which a user can select one or more sensor components from a menu 721. The menu 721 in some implementations includes a list of the headsets and sensor components which are stored and available in a headset database

452, as described herein. The menu 721 may be presented as a drop-down menu, as shown, and may include a slider and other related features typically provided with menu interfaces.

The menu 721 in some implementations includes a list of one or more available headsets or headset configurations (e.g., Alpha, Beta, Gamma, as shown) which include a predetermined set of sensor components. For example, selecting Beta would include all or most of the sensor components associated with the Beta headset configuration. The wearable device 101 described herein may be listed on the menu 721 of available headsets.

The menu 721, as shown, also includes a list of one or more discrete sensor components or sets of sensor components (e.g., Alpha Global Shutter, Beta RGB+Depth, Gamma design option 2) which may be selected individually; separate from any headset. For example, selecting Alpha Global Shutter would not include the other sensor components associated with the Alpha headset.

The sensor component 720 in some implementations includes an upload utility 722, as shown, through which a user can upload a file that includes data about one or more sensor components, or sets of sensor components, in a particular arrangement. The file may include a calibration file, which may be available in JSON format. The file may represent a new version of an existing headset file or a hypothetical version of a headset under development.

The sensor component 720 in some implementations displays a candidate sensor component 725 in a selection window, as shown. As components are selected, the sensor component 720 stacks the selected sensor elements 765 together to assemble a simulated sensor configuration 760, as described herein. The sensor component 720 presents the selected sensor elements 765 together on the display in the form of a graphical sensor array model 760-M, as shown.

The selected sensor elements 765 for a particular simulated sensor configuration 760 may include one or more simulated cameras, such as the camera systems and arrangements described herein, and may further include one or more simulated motion sensors, such as the inertial measurement units (IMUs) described herein.

The simulated sensor configuration 760 is described as "simulated" because it may include one or more sensor elements in a particular arrangement that is hypothetical, under development, or otherwise not available together in a single product, such as a commercially available VR headset. In this aspect, the sensor component 720 facilitates the assembly of a simulated sensor configuration 760 for use in research, development, testing, product trials, and similar efforts without necessarily building a physical prototype headset with physical sensor components.

Figure 13:
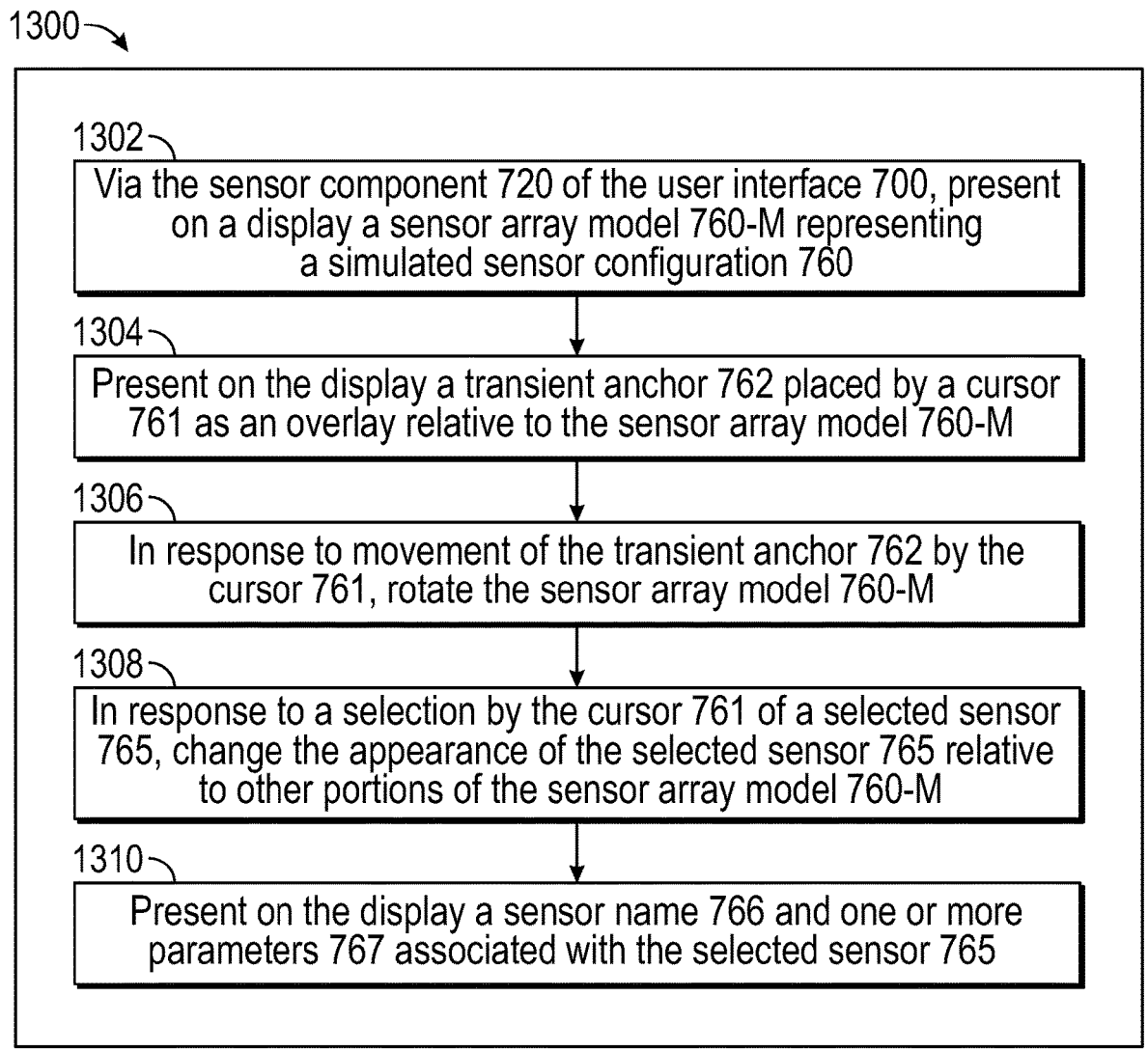
FIG. 13 is a flow chart depicting an example method of displaying a sensor array model.

Referring again to FIG. 7B, the sensor array model 760-M includes the selected sensor elements 765, displayed together, in a representative graphical arrangement. In some implementations, the sensor array model 760-M is interactive, allowing the selection of one or more sensor elements 765, as described in a flow chart 1300 (FIG. 13). A selecting element, such as the cursor 761 shown in FIG. 7B, may be used select a particular sensor element 765. In response, the sensor component 720 presents on the display information about the selected sensor element 765 in a menu frame 763. The information, as shown, includes a sensor name 766 and a list of one or more parameters 767. In addition, the cursor 761 may be used to select a point near the model 760 that serves as a virtual anchor 762. Using the cursor 761 as a handle, the sensor array model 760 can be rotated on the display.

FIG. 13 is a flow chart 1300 depicting a method of displaying a sensor array model 760-M. One or more of the steps shown and described may be performed simultaneously, in a series, in an order other than shown and described, or in conjunction with additional steps. Some steps may be omitted or, in some applications, repeated.

At block 1302, the sensor component 720 presents a sensor array model 760-M on a display. The sensor array model 760-M in some implementations is presented in a manner that is dimensionally representative of the selected sensor elements 765 as they are configured and arranged. For example, the sensor array model 760-M shown in FIG. 7B is a three-dimensional wireframe model that shows four selected sensor elements 765, arranged in an upper pair and a lower pair. The sensor array model 760-M corresponds approximately to the relative positions of the selected sensor elements 765 that were selected to be part of the simulated sensor configuration 760.

At block 1304, the cursor 761 may select a point near the sensor array model 760-M and, in response, the sensor component 720 displays a transient anchor 762, as shown in FIG. 7B.

At block 1306, the sensor component 720 rotates the sensor array model 760-M in response to movement of the transient anchor 762, using the cursor 761 as a handle. In this aspect, rotating the sensor array model 760-M facilitates viewing of the one or more selectable sensors 765 and their relative positions.

At block 1308, the cursor 761 may select a particular sensor illustrated on the sensor array model 760-M and, in response to such a selection, the sensor component 720 highlights the selected sensor element 765.

At block 1310, the sensor component 720 presents on the display information about the selected sensor element 765 in a menu frame 763. The information includes a sensor name 766 along with a list of one or more parameters 767, as shown in FIG. 7B.

Figure 7C:
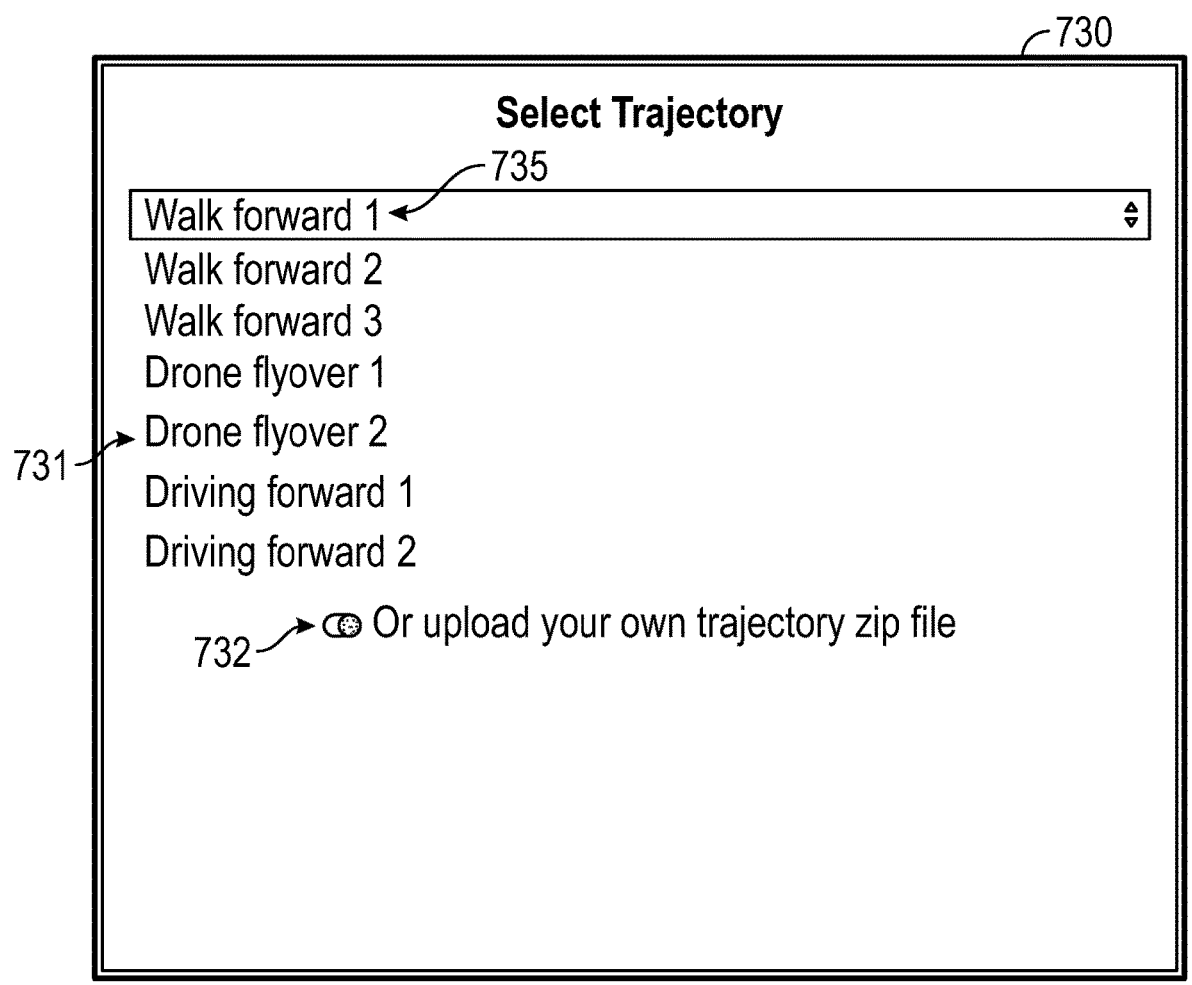
FIG. 7C is an illustration of an example trajectory component of the user interface of FIG. 7.

FIG. 7C is an illustration of an example trajectory component 730 which provides an interface through which a user can select a trajectory 735 from a collection 731 of trajectories available in the trajectory database 454, as described herein. The trajectory component 730 in some implementations presents on the display a trajectory upload option 723, through which a user can upload an alternate trajectory file, which may be available as a ZIP file. For example, a user may record a primary reference set 610, as described herein, and save it in memory and/or in the trajectory database 454. The upload option 732 may be used to retrieve a recorded primary reference set 610.

A predefined trajectory 735 typically includes complete data about along a defined course, including for example the positions, orientations, movements (e.g., inertial pose vectors for each pose) at each position along the defined course. For a predefined trajectory 735, a SLAM application is typically not required to extract data from camera images or IMU data, as described herein, to generate a headset trajectory.

Figure 7D:
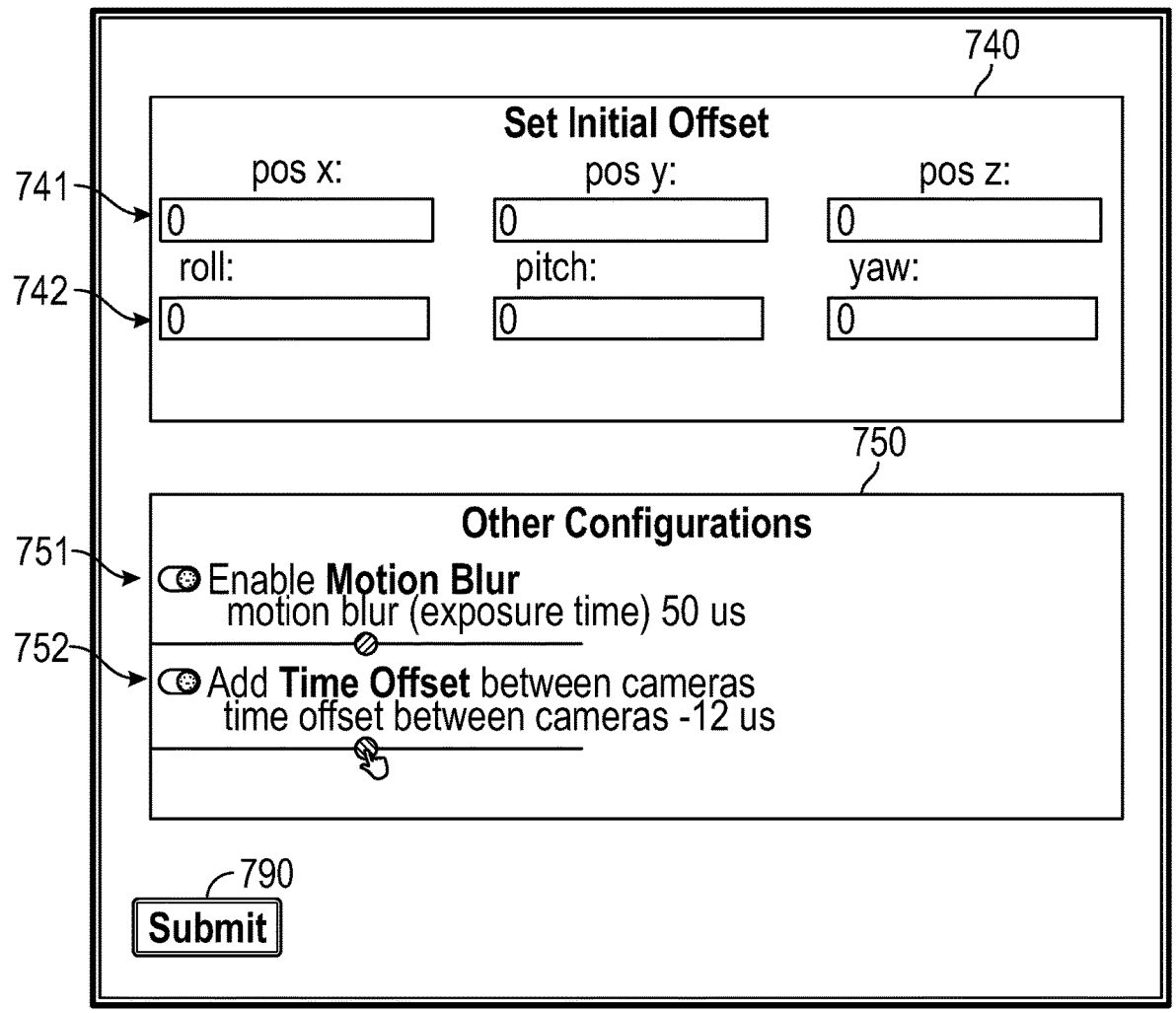
FIG. 7D is an illustration of example offset, configurations, and submit components of the user interface of FIG. 7.

FIG. 7D is an illustration of an example offset component 740, an example configurations component 750, and an example submit component 790. The offset component 740 in some implementations provides an interface through which a user can enter an initial offset, including translational coordinates 741, rotational coordinates 742, or a combination thereof.

When generating an output dataset 990, the starting point associated with a selected trajectory file (or a recorded primary reference set 610) will be adjusted in accordance with the initial offset coordinates 741, 742. For example, a trajectory or path may start at an origin point (zero, zero, zero) and in a level orientation relative to rotational coordinates. The initial offset coordinates 741, 742 adjust the starting point so that processing begins according to the offset translational coordinates 741 (x, y, z) and the offset rotational coordinates 742 (roll, pitch, yaw).

The configurations component 750 in some implementations provides an interface through which a user can enter a motion blur setting 751 and a time offset setting 752, as shown, each configured with a selector and a slider. These settings 751, 752 are applied when the system 1000 generates a ground truth dataset, such that one or more images is rendered in accordance with the settings 751, 752. The motion blur setting 751 may be expressed in microseconds (e.g., fifty microseconds, as shown) and may be applied, during image rendering, to adjust the simulated exposure time of a portion of an image. The time offset setting 752 may be expressed in microseconds (e.g., negative twelve microseconds, as shown) and represents a time offset between cameras, to be applied during image rendering.

The configurations component 750 in some implementations provides an interface through which a user can input a variety of other configuration settings, including for example weather conditions, lens effects (e.g., flare, vignetting), exterior lighting conditions (e.g., sun direction, intensity, movements), interior lighting conditions (e.g., lamps and fixtures), character animations, facial landmarks, and output format (e.g., ZIP, raw data, VIO-ready).

The submit component 790 in some implementations includes a simple button, as shown. Pressing submit sends the job, based on the selections, uploads, or a combination thereof, to the process of generating a ground truth dataset as described herein.

Figure 14:
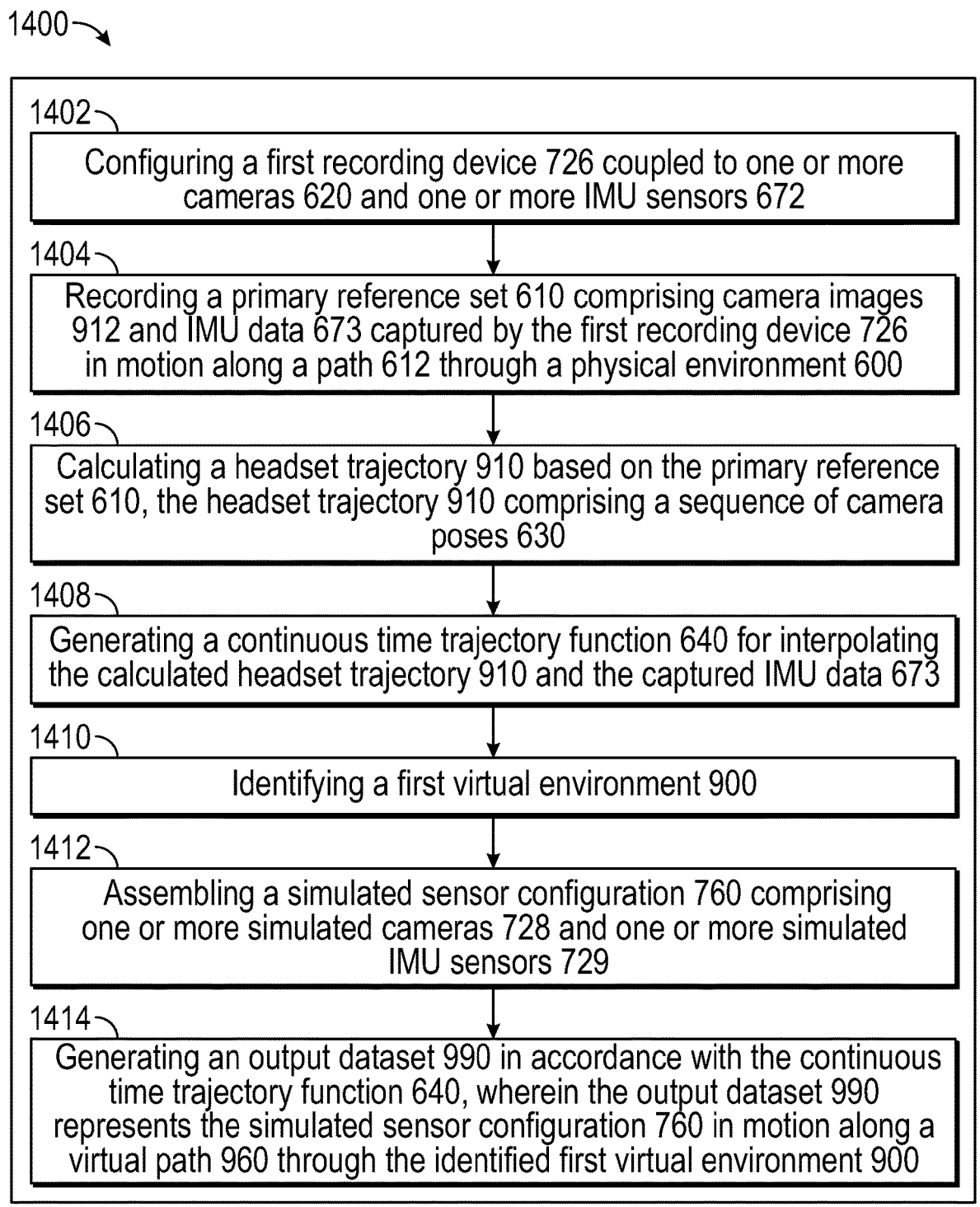
FIG. 14 is a flow chart depicting an example method of generating a ground truth dataset.

FIG. 14 is a flow chart 1400 depicting the steps in an example method of generating a ground truth output dataset 990. Those of skill in the art will understand that one or more of the steps shown and described may be performed simultaneously, in a series, in an order other than shown and described, or in conjunction with additional steps. Some steps may be omitted or, in some implementations, repeated. For example, the processes described in the flow chart 1400 may be executed for generating an output dataset 990 as described herein and for generating a plurality of additional or sample output datasets, as described herein.

Block 1402 describes an example step of configuring a first recording device 726 that is coupled to one or more cameras 620 and one or more inertial measurement unit (IMU) sensors 672. For example, the eyewear device 100 described herein may operate as the first recording device 726. In other examples, the first recording device 726 is a mobile phone, tablet, VR headset, or other portable device that includes at least one camera 620 and an IMU 672. The camera 620 may include any of a variety of camera systems, including cameras similar to those described herein. The IMU sensor 672 may include any of a variety of motion sensors, including sensors similar to the inertial measurement units (IMUs) 472, 572 described herein. In some implementations, the first recording device 726 is worn by a user while moving through a physical environment 600.

Block 1404 of FIG. 14 describes an example step of recording a primary reference set 610 using the first recording device 726. In some implementations, the primary reference set 610 is captured by the first recording device 726 in motion, as it traverses a real path 612 through a physical environment 600. The primary reference set 610 includes a (a) a series of real images 912 captured by the camera 620 and (b) a series of real motion data 673 captured by the IMU 672. The first recording device 726 in some implementations includes or is coupled to a trajectory recording application 460 to facilitate the recording process.

The series of real images 912, in some implementations, is captured by one or more high-resolution digital video cameras, capturing images at an image sample rate (e.g., thirty to sixty frames per second, or more). The captured real images 912 include not only photographic values but also a variety of data (e.g., depth data) that is stored as part of the image. An image with depth data, for example, is stored as a three-dimensional matrix. Each vertex of the matrix includes a color attribute (e.g., for each pixel), a position attribute (X, Y, Z coordinates), a texture, a reflectance, and other attributes or combinations thereof. The position attributes facilitate the ability of the SLAM application 462 to determine or extract values from each digital image, such as the camera location and camera orientation (i.e., camera pose) associated with each image, as well as the relative motion of the camera across a series of images.

The series of real motion data 673, in some implementations, is captured the IMU 672 at an inertial sample rate 674 (e.g., one hundred inertial samples per second (Hz), one thousand Hz, or more). The IMU 672 captures the motion of the user wearing the first recording device 726 in exquisite detail. The motion of the user through the environment includes not only purposeful, macro movements such as walking over various terrain, but also micro movements, such as minute changes in head position, involuntary body movements, and barely perceptible movements such as the vibrations produced by breathing.

During recording, in some implementations, a portion of the series of real images 912 may be presented on display as they are being captured, in real time, as illustrated in FIG. 8C. For reference, FIG. 8A illustrates an example view 801 of a real, physical environment 600 (e.g., an office, an outdoor space) from the perspective of a user donning or carrying a first recording device 726 while recording. FIG. 8B illustrates an example virtual environment 802 from the same perspective, as if the user were able to see it. FIG. 8C illustrates an example composite view 800 in which a portion 803 of the virtual environment 802 is presented an overlay relative to the physical environment 600. The composite view 800 offers a preview of the virtual environment 802 while allowing the user to move safely, along an intended path, through the physical environment 600.

In some implementations, a predefined trajectory file 735 may be selected, using the example trajectory component 730 shown in FIG. 7C, instead of executing the process of recording a primary reference set 610.

Block 1406 of FIG. 14 describes an example step of calculating a headset trajectory 910 based on the recorded primary reference set 610. The calculated headset trajectory 910 includes a sequence of camera poses 630. The headset trajectory 910 in some implementations is calculated using a SLAM application 462, as described herein, to determine or extract values from the series of real images 912 and generate the sequence of camera poses 630, which include both a camera location and a camera orientation associated with each real image 912. In this aspect, the camera poses 630 represent the relative motion of the camera across the series of images 912 over time.

Figure 16:
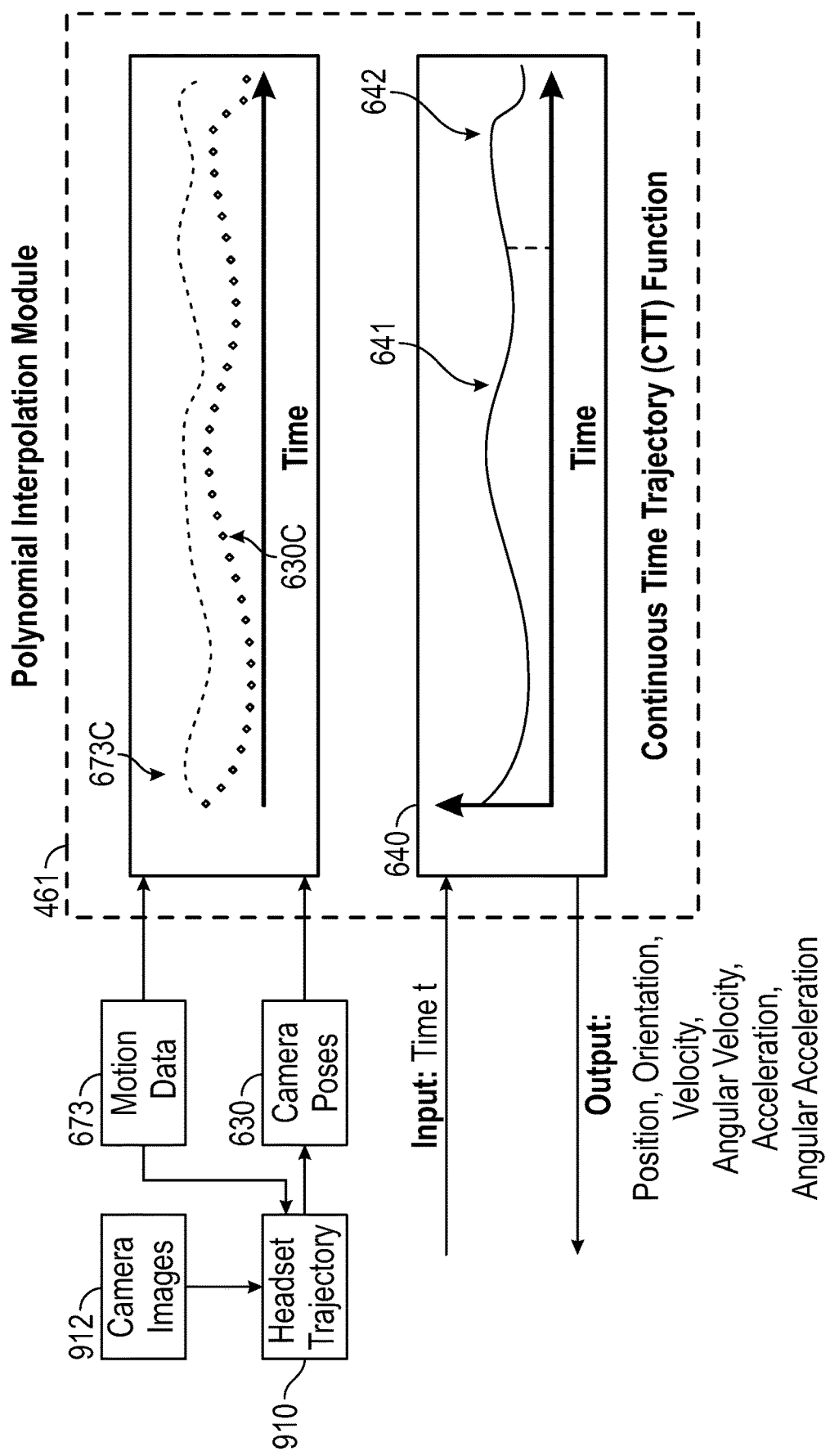
FIG. 16 is a diagrammatic illustration of an example polynomial interpolation module, suitable for use with the example ground truth dataset generation system of FIG. 4.

FIG. 16 is a diagrammatic illustration that includes the series of real images 912 and the series of real motion data 673, which are used to calculate the headset trajectory 910 and the camera poses 630. As shown in the upper graph, the smaller data points 673C represent the real motion data 673 over time. The larger data points 630C represent the camera poses 630 over time. As shown, there are points in time where there is no camera pose data (i.e., the blank interval between the larger data points). Similarly, there are points in time where there is no motion data (i.e., the blank interval between the smaller data points). The process of calculating a headset trajectory 910 in some implementations is performed by the SLAM application 462.

Block 1408 of FIG. 14 describes an example step of generating a continuous time trajectory (CTT) function 640 for interpolating the calculated headset trajectory 910 and the series of real motion data 673. The CTT function 640 in some implementations is generated using a polynomial interpolation module 461.

As illustrated in FIG. 16, the headset trajectory 910 (including the camera poses 630) and the real motion data 673 represent the input data for the example polynomial interpolation module 461. Referring again to the upper graph, the smaller data points 673C represent the real motion data 673 over time. The larger data points 630C represent the camera poses 630 over time. As shown, there are points in time where there is no camera pose data (i.e., the blank interval between the larger data points). Similarly, there are points in time where there is no motion data (i.e., the blank interval between the smaller data points). Some applications might interpolate the data between the points (e.g., at every blank interval) applying Newton's laws of motion to estimate the missing data. In practice, this approach would consume too much time and computing resources. Moreover, this approach would introduce errors because some of the input data contains noise or other disturbances. In a related aspect, at block 1406 of the example method, Newton's laws of motion were applied to the data when the SLAM application 462 was used to calculate the headset trajectory 910.

The CTT function 640 is illustrated in the lower graph which, as shown, generates a single curve (e.g., a first curve 641, a subsequent curve 642, and so forth, as shown) over time. For any time (t), the CTT function 640 returns output data including position, orientation, velocity, angular velocity, acceleration, angular acceleration, and in some implementations the values necessary to calculate such output data.

The CTT function 640 in some implementations is a polynomial equation that includes one or more fitting coefficients. In one example, the CTT function 640 includes one or more Chebyshev polynomial functions, in which the value of x at time (t) is represented by:

$$x(t) = \Sigma_k c_k b_k(t)$$

in which $b_k(t)$ is the $k^{th}$ basis function and $c_k$ are the fitting coefficients of the basis function. In this example, the basis function $b_k(t)$ includes Chebyshev polynomials for a given time (t) (as shown on the x-axis of the lower graph shown in FIG. 16). The Cheyshev polynomials are defined recursively as:

$$b_0(t) = 1,$$

$$b_1(t) = t, \text{ and}$$

$$b_{n+1}(t) = 2t\, b_n(t) - b_{n-1}(t)$$

The fitting coefficients $c_k$ vary, depending on the input data. For example, for the input data during a first time interval, the fitting coefficients $c_k$ are calculated so that the first curve 641 closely approximates the input data. For a subsequent time interval, a subsequent set of fitting coefficients $c_k$ is calculated so that the subsequent curve 642 closely approximates the input data during the subsequent time interval.

Referring again to FIG. 16, the input data includes both the captured real motion data 673 and the calculated sequence of camera poses 630. As shown, the motion data 673 is used twice: first, as input data for calculating the headset trajectory 910 and, again, as input data for generating the CTT function 640. As shown in the upper graph, the motion data points 673C in this example are generally more frequent than the camera pose data points 630C. In this aspect, the process of generating a CTT function 640 uses Chebyshev polynomials to mathematically restrict the interpolation of the data points that fall within the blank intervals between the camera pose data points 630C.

The CTT function 640 returns values for a number of time intervals which, when combined, produce an entire trajectory (e.g., the continuous curve, as shown in the lower graph of FIG. 16). The continuous curve closely approximates the input data (e.g., the smaller data points 673C which represent the real motion data 673 and the larger data points 630C which represent the camera poses 630). As shown, the first curve 641 is associated with a first time interval, the subsequent curve 642 is associated with a subsequent time interval, and so forth.

The CTT function 640 generates a continuous curve, as shown in FIG. 16, which illustrates that, mathematically, for any time (t), the CTT function 640 returns an output data value (e.g., position, orientation, velocity, etc.). For example; even if the sequence of camera poses 630 in the headset trajectory 910 was calculated at a relatively low frequency (e.g., only thirty-six times per second), the CTT function 640 returns output data values which can be used to estimate camera poses for the output dataset 990 more (or less) frequently (e.g., seven-hundred twenty times per second). In a related aspect, the CTT function 640 is also capable of returning a series output data values (e.g., positions, orientations, velocities, etc.) at any particular or selected time interval (e.g., ten, one hundred, one thousand times per second) for any time duration. In this aspect, for example, the CTT function 640 (associated with a single headset trajectory 910 and series of motion data 673) can be used to generate a plurality of different output datasets (e.g., positions and angular velocities, one hundred values per second, over a duration of three minutes; orientations and accelerations, fifty values per second, over a duration of ninety seconds; and the like).

Block 1410 of FIG. 14 describes an example step of identifying a first virtual environment 900. A virtual environment 900 typically includes a virtual map 913 and a vast library of virtual images, image assets, metadata, artifacts, sensory data files, depth maps, and other data for generating a VR experience.

The process of identifying a first virtual environment 900 in some implementations includes receiving a selection from a list 711 of virtual environments, through an interface such as the example environment component 710 shown in FIG. 7A.

Block 1412 of FIG. 14 describes an example step of assembling a simulated sensor configuration 760 that includes one or more simulated cameras 728 and one or more simulated motion sensors 729. The simulated cameras 728 may include any of a variety of camera systems, including those described herein. The simulated motion sensors 729 may include any of a variety of motion sensors, including the inertial measurement units (IMUs) described herein. The sensor configuration 760 is referred to as simulated because the process of assembling it refers to and includes the virtual selection and assembly of one or more elements 728, 729 to create a virtual model of a device (e.g., a virtual VR headset) that includes or supports the selected elements of the simulated sensor configuration 760.

The process of assembling a simulated sensor configuration 760 in some implementations includes selecting sensor elements 765 through an interface such as the example sensor component 720 shown in FIG. 7B.

In some example implementations, the process of selecting a simulated sensor configuration 760 includes selecting an initial offset position 741 and an initial orientation 742 relative to the virtual map 913 associated with the selected first virtual environment 900. FIG. 7D is an illustration of an example offset component 740 that provides an interface for selecting and entering an initial offset, including translational coordinates 741, rotational coordinates 742, or a combination thereof. In this aspect, applying the initial offset position 741 and the initial orientation 742 settings, and using the CTT function 640, generates a new or different sample output dataset, referred to as an offset output dataset.

Block 1414 of FIG. 14 describes an example step of using the CTT function 640 to generate an output dataset 990 for the selected simulated sensor configuration 760. The resulting output dataset 990 represents the output data associated with the selected simulated sensor configuration 760 (e.g., the simulated cameras 728 and simulated IMU sensor 729) as if the simulated sensor configuration 760 were moving along a virtual path 960 through the identified first virtual environment 900. The virtual path 960 is closely correlated with the path 612 through the real environment 600 because the data collected by the first recording device 726 along the path 612 was used when generating the CTT function 640.

As described above, at block 1408, the CTT function 640 was generated based on data captured by sensors on the first recording device 726 in a real environment. Now, at block 1414, the CTT function 640 is being used to generate an output dataset 990—not for the sensor configuration of the first recording device 726, but for the simulated sensor configuration 760 in relation to a virtual environment 900.

For example, the first recording device 726 may have included a single IMU 672 capturing real motion data 673 at an inertial sample rate 674 of sixty samples per second, as the first recording device 726 moved along a path 612 in a real, physical environment 600. An example simulated sensor configuration 760 may include four simulated IMU sensors 729 positioned at specific locations on a simulated device (e.g., a virtual VR headset). In use, one can use the CTT function 640 to generate an output dataset 990 that includes values (e.g., position, orientation, acceleration) for each of the four simulated IMU sensors 729 as if the simulated sensor configuration 760 were moving along a virtual path 960 through the identified first virtual environment 900. Because the CTT function 640 was generated using real data captured along a real path, the output dataset 990 for the simulated sensor configuration 760 produces a realistic and life-like series of images and movement.

The process of generating an output dataset 990 in some implementations includes selecting and applying a particular sample rate (e.g., N values per second), referred to herein as a modified sample rate. As shown in FIG. 16, the CTT function 640 generates a continuous curve over time. The modified sample rate may be selected and applied to any or all of the output values (e.g., N position coordinates per second, N orientation vectors per second, N velocity values per second) when generating an output dataset 990. In this aspect, the modified sample rate may be an arbitrary sample rate; that is, a rate that is not based on or related to another sample rate (e.g., the sample rates associated with the primary reference set 610).

In some implementations, the modified sample rate may be equal to the image sample rate of the camera 620 on the first recording device 726, the inertial sample rate 674 of the IMU 672 on the first recording device 726, a divisor of the image sample rate and the inertial sample rate 674, or the primary sample rate associated with the sequence of camera poses 630 which are part of the calculated headset trajectory 910. In some implementations, selecting a divisor includes mathematically comparing the image sample rate (e.g., thirty-six image frames per second) and the inertial sample rate 674 (e.g., seven-hundred twenty IMU samples per second) to identify one or more divisors (e.g., seventy-two, three-hundred sixty).

In a related aspect, the process of selecting and applying a modified sample rate may be used to generate a plurality of sample output datasets, each characterized by a particular modified sample rate—all of which are generated using the same CTT function 640.

The process of generating an output dataset 990 includes rendering a series of virtual images 970 for each of the one or more simulated cameras 728 of the simulated sensor configuration 760. The process of generating an output dataset 990 also includes generating a series of simulated IMU data 980 for each of the one or more simulated IMU sensors 729 of the simulated sensor configuration 760.

In some implementations, an image rendering application 464 facilitates the process of rendering a series of virtual images 970 associated with the first environment 900 for each of the one or more simulated cameras 728. Each virtual image 970 includes a view of the first environment 900 from the perspective of a user who is positioned at a virtual waypoint along a virtual path 960, as described herein. The virtual path 960 may begin at a position correlated with the starting point of the generated continuous time trajectory 640, or it may begin at a selected initial offset position 741. Similarly, the user orientation along the virtual path 960 may be correlated with the starting orientation data of the generated continuous time trajectory 640, or it may begin at a selected initial orientation 742.

The process of generating an output dataset 990 also includes generating a series of simulated IMU data 980 for each of the one or more simulated IMU sensors 729 of the simulated sensor configuration 760. In this aspect, the series of simulated IMU data 980 corresponds generally to the sequence of camera poses 630. Because the CTT function 640 was generating using the real motion data 673, the motion as described by the series of simulated IMU data 980 in the output dataset 990 is very closely correlated with the motion captured by the first recording device 726 when it traversed a real path in a physical environment 600.

Figure 9:
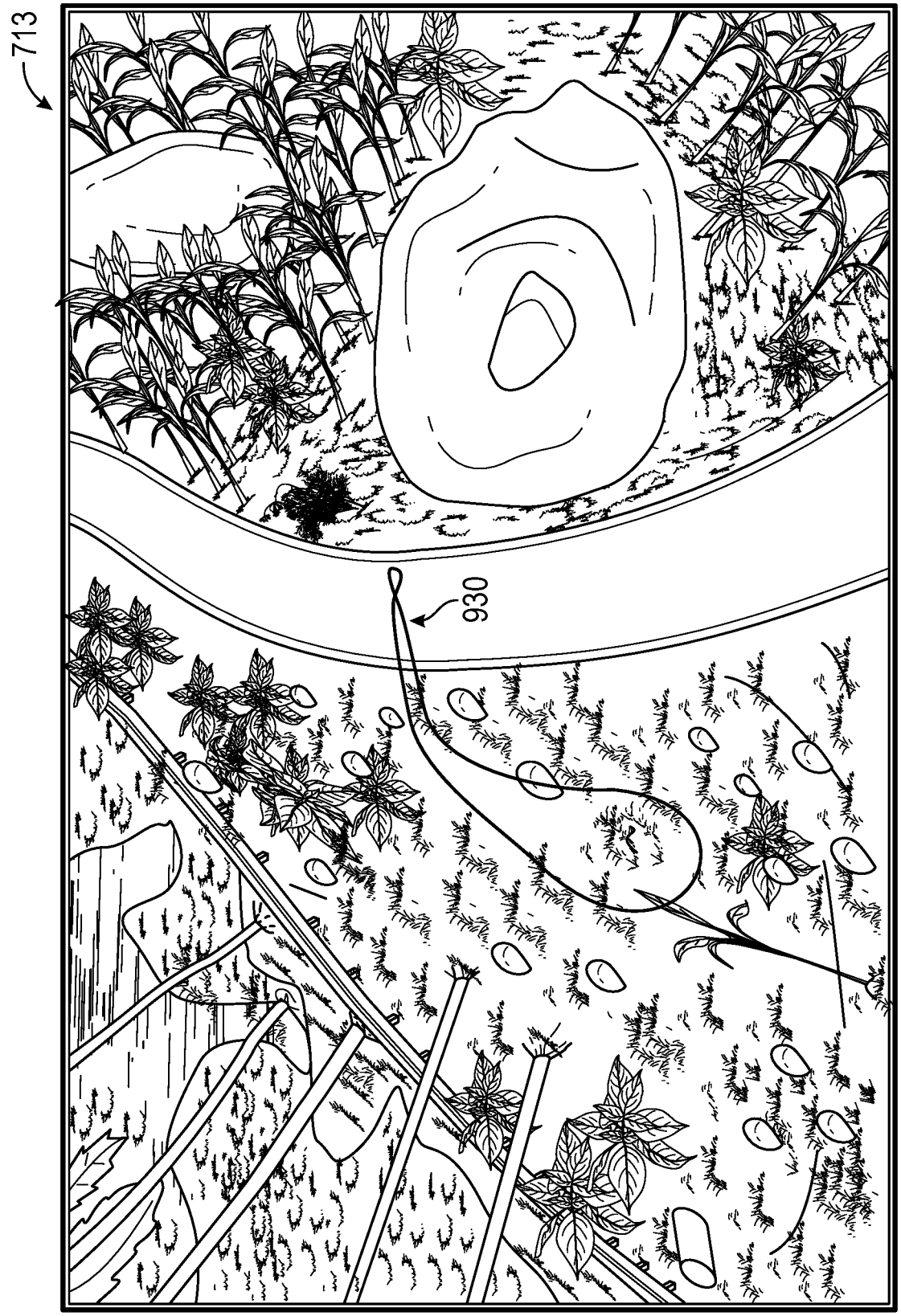
FIG. 9 is an illustration of an example trace projected as an overlay relative to an example map view associated with a virtual environment, suitable for use with the ground truth dataset generation system of FIG. 4.

FIG. 9 is an illustration of an example trace 930 presented on a display as an overlay relative to an example map view 713 associated with a virtual environment 900. In some implementations, the virtual environment 900 is identified at block 1410 of the example method shown in FIG. 14. In other implementations, the virtual environment 900 is selected from a list 711 through an interface such as the example environment component 710 shown in FIG. 7A. The data associated with a selected virtual environment 900 typically includes a virtual map 913.

Referring again to block 1404 of FIG. 14, the primary reference set 610 is captured by the first recording device 726, in motion, as it traverses a real path 612 through a physical environment 600. In some implementations, the primary reference set 610 is used to calculate a virtual path 960 through a virtual environment 900. Accordingly, the virtual path 960 is closely correlated with the real path 612. In a related aspect, the trace 930 shown in FIG. 9 corresponds to at least a portion of the virtual path 960.

The map view 713 in FIG. 9 corresponds to at least a portion of the virtual map 913 associated with the selected virtual environment 900. In some implementations, the map view 713 is sized and shaped to correspond to the size and shape of the trace 930. The view of the trace 930, as shown in FIG. 9, allows the user to observe a preview of the location and shape of virtual path 960 relative to the selected first virtual environment 900 before submitting the data for further processing (e.g., generating output dataset 990, as described herein). For example, if the user observes that the trace 930 shown in FIG. 9 is unacceptable (e.g., the trace 930 passes through a solid virtual object such as a wall or structure), then the user may elect to use the first recording device 726 to record another primary reference set 610.

Figure 15:
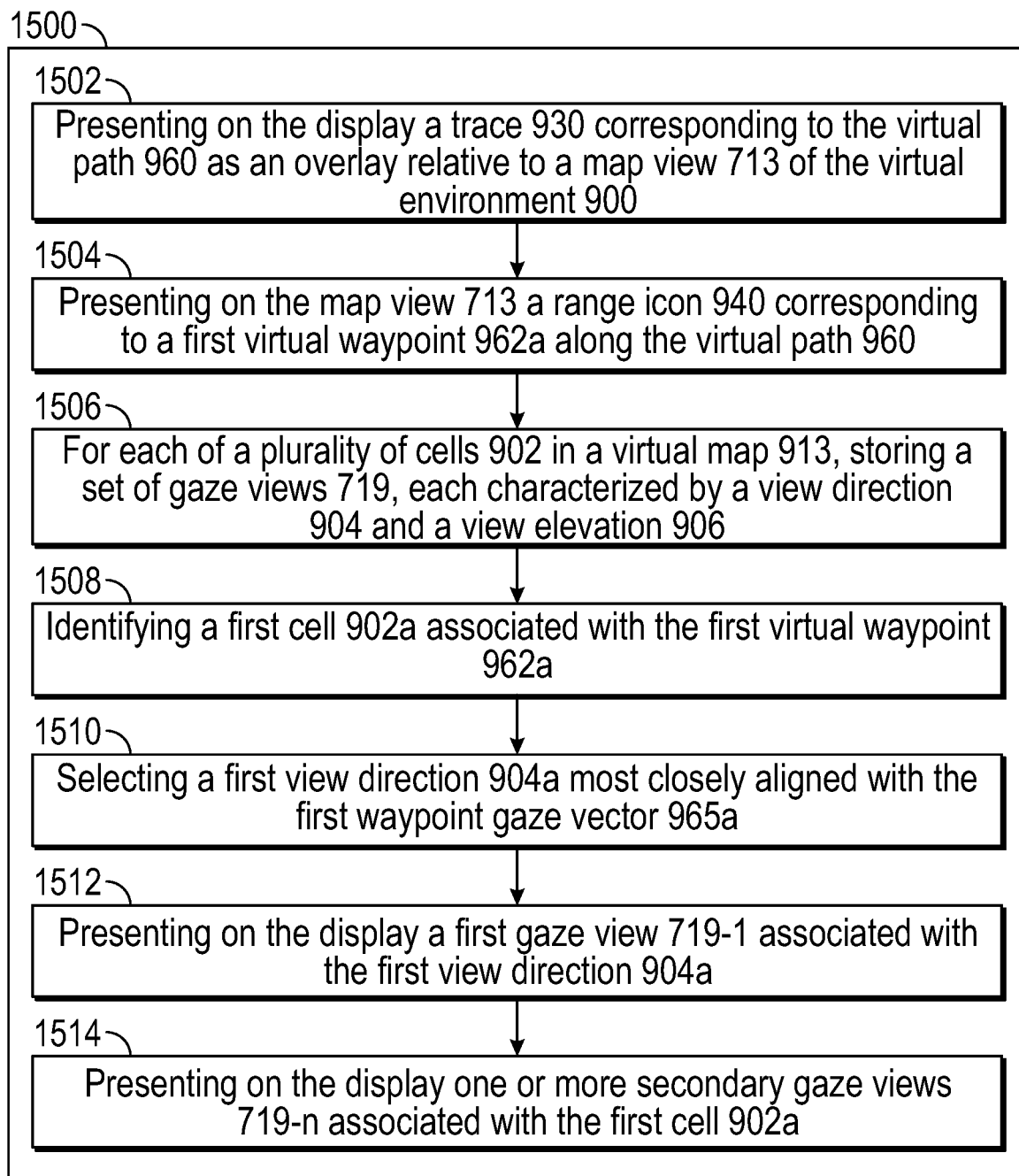
FIG. 15 is a flow chart depicting an example method of presenting previews associated with a virtual path.

FIG. 15 is a flow chart 1500 depicting an example method of presenting previews associated with a virtual path 960. Those of skill in the art will understand that one or more of the steps shown and described may be performed simultaneously, in a series, in an order other than shown and described, or in conjunction with additional steps. Some steps may be omitted or, in some implementations, repeated.

Block 1502 describes an example step of presenting a trace 930 on a display as an overlay relative to a map view 713 associated with a virtual environment 900, as shown in FIG. 9. The process of presenting a trace 930 in some implementations includes a preliminary step of calculating a virtual path 960 through a selected virtual environment 900, in which the virtual path 960 is based on data about the real path 612 that was traversed through a physical environment 600 (and stored in the primary reference set 610). In some implementations, the process of calculating a virtual path 960 involves a point-by-point projection of the real path 612 onto the virtual map 913 associated with the selected virtual environment 900.

The process of presenting a trace 930 in some implementations includes identifying the map view 713 over which the trace 930 will be presented. The map view 713 is a portion of the virtual map 913 associated with the selected virtual environment 900. The process of identifying the map view 713 in some implementations includes selecting a size and shape that corresponds to the size and shape of the trace 930. For example, the map view 713 shown in FIG. 9 is sized and shaped in total area so that the trace 930 occupies approximately one third of the total area of the map view 713. The map view 713 is sized and shaped with borders such that the trace 930 is presented approximately near the center of the map view 713.

Block 1504 of FIG. 15 describes another example step of presenting a trace 930 on a display as an overlay relative to an alternative example map view 713. The example map view 713 shown in the upper right corner of FIG. 10B is relatively smaller compared to the example map view 713 in FIG. 9. Block 1504, more specifically, describes an example step of presenting a range icon 940 along a preview trace 930 on a map view 713, wherein the range icon 940 corresponds to a first virtual waypoint 962a along the calculated virtual path 960. The range icon 940 in some implementations is oriented in a northerly cardinal direction, thereby providing a recognizable map-based visual cue. The range icon 940 in some implementations is oriented in a direction that corresponds to the first waypoint gaze vector 965a, thereby providing a visual cue about the gaze direction associated with the first virtual waypoint 962a. An example virtual path 960 with waypoints and gaze vectors is shown in FIG. 10A.

Figure 10A:
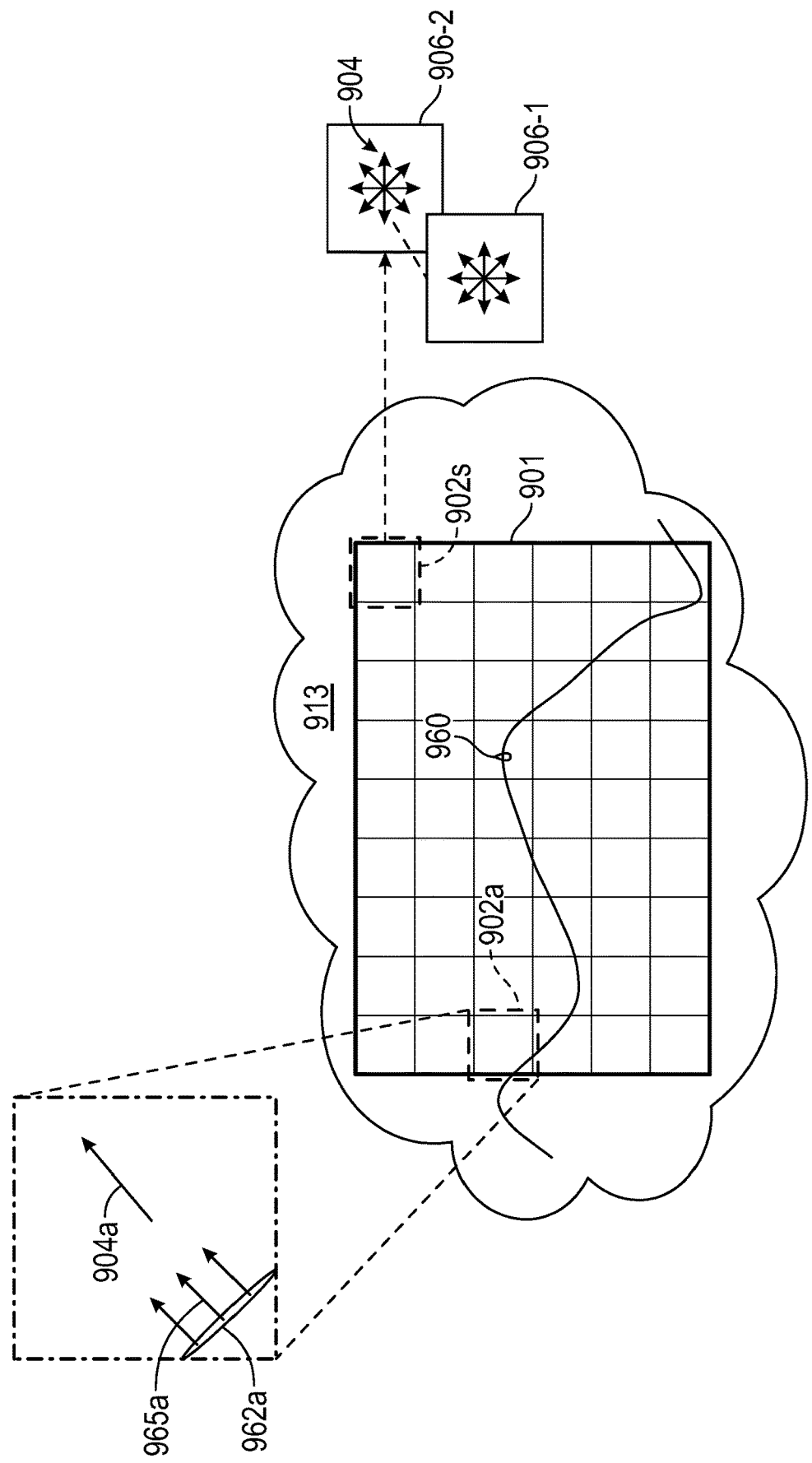
FIG. 10A is a schematic illustration of an example virtual path, waypoints, and gaze view directions.
Figure 10B:
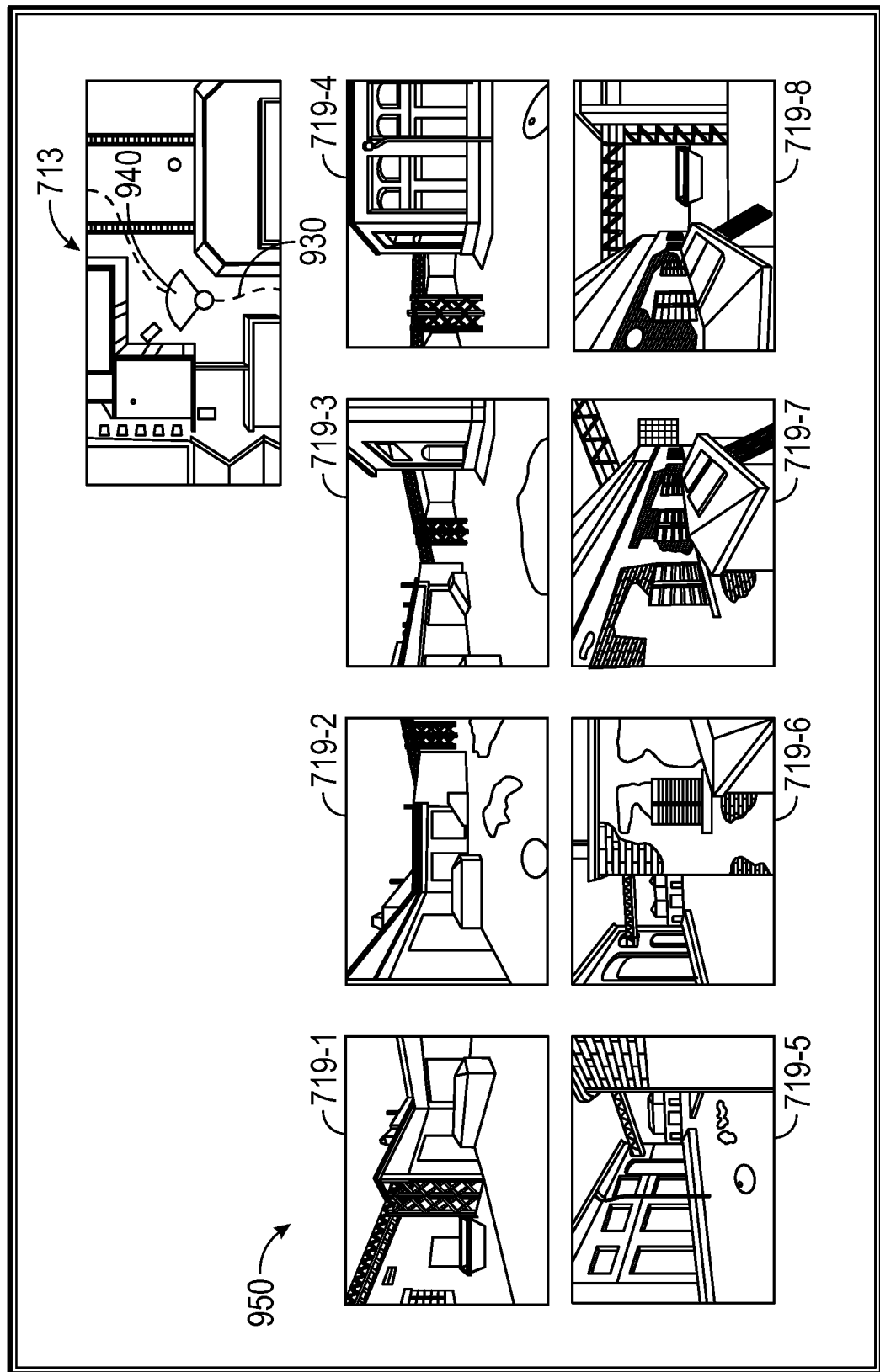
FIG. 10B is an illustration of an example plurality of waypoint gaze views and a range icon displayed on a map view for reference.

FIG. 10A is a schematic illustration of an example virtual path 960 relative to a portion of the virtual map 913 associated with the selected virtual environment 900. As shown, a framework 901 comprising a plurality of cells 902 has been applied to the virtual map 913. The virtual path 960 traverses or passes near a first cell 902a. The first virtual waypoint 962a is located within the first cell 902a. As shown in the detail view, the portion of the virtual path 960 passing through the first cell 920a includes a segment referred to as a first virtual waypoint 962a. A first waypoint gaze vector 965a is associated with the first virtual waypoint 962a. In accordance with the generated output dataset 990, the first waypoint gaze vector 965a represents the view direction of the simulated sensor configuration 760 in motion along the virtual path 960.

Each cell 902 in the framework 901 is characterized by a set of view directions 904 and a set of view elevations 906, as shown in FIG. 10A with reference to sample cell 902s. In some implementations, the set of view directions 904 includes eight directions (e.g., cardinal and ordinal directions, as shown). In some implementations, the set of view elevations 906 is characterized by one or more heights above the ground or other virtual surface in the virtual environment 600. For example, a first view elevation 906-1 may be characterized by a height of three feet (e.g., possibly representative of a kneeling or crouching position) and a second view elevation 906-2 may be characterized by a height of six feet (e.g., representative of standing or walking). In some implementations, each view elevation includes the same set of view directions.

Block 1506 of FIG. 15 describes an example step of storing a set of gaze views 719 for each of a plurality of cells 902 associated with a framework 901 imposed on a virtual map 913, wherein each gaze view 719 is characterized by a view direction 904 and a view elevation 906.

The process of storing a set of gaze views 719 for each cell 902 in some implementations includes selecting an image that is associated with each view direction 904 and each view elevation 906. For example, the images may be selected from the data associated with the selected virtual environment 900, stored in the virtual environment database 450. Referring again to the sample cell 902s in FIG. 10A, the set of gaze views 719 for the sample 902s includes a set of eight images for each view elevation 906-1, 906-2, wherein the eight images are associated with one of the eight view directions 904. In some implementations, the sets of gaze views 719 are intended to provide a general preview, as opposed to a detailed rendering. In this aspect, the sets of gaze views 719 may be relatively low resolution (e.g., compared to high-resolution rendered images) and may be stored in a cache for quick retrieval.

FIG. 10B is an illustration of an example gaze preview 950 which includes an example set of waypoint gaze views 719-1 through 719-8 together with, in the upper right corner, a range icon 940 presented along a preview trace 930 on a map view 713.

Block 1508 of FIG. 15 describes an example step of identifying a first cell 902a that is associated with a first virtual waypoint 962a. The process in some implementations includes identifying the cells through which the virtual path 960 passes. As illustrated in FIG. 10A, the virtual path 960 traverses or passes through a first cell 902a. The first virtual waypoint 962a is located within the first cell 902a, as shown in the detail view. The first virtual waypoint 962a includes a first waypoint gaze vector 965a, as shown. The first waypoint gaze vector 965a in some implementations represents the view direction of the simulated sensor configuration 760 in motion along the virtual path 960, in accordance with the generated output dataset 990. The first waypoint gaze vector 965a may be oriented in any direction relative to the first virtual waypoint 962a. For example, the first waypoint gaze vector 965a is not necessarily perpendicular to the plane of the first virtual waypoint 962a, as shown in this example.

Block 1510 of FIG. 15 describes an example step of selecting a first view direction 904a that is most closely aligned with first waypoint gaze vector 965a. Recall that each cell 902 is characterized by a set of view directions 904 (e.g., eight directions, as shown in reference to sample cell 902s). The process selecting a first view direction 904a includes comparing the first waypoint gaze vector 965a associated with cell 902a with the set of view directions 904 for cell 902a. In the illustrated example, the first view direction 904a (e.g., northeast) is most closely aligned with first waypoint gaze vector 965a.

Block 1512 of FIG. 15 describes an example step of presenting, on a display, a first gaze view 719-1 that is associated with the first view direction 904a. For example, as shown in FIG. 10B, the first gaze view 719-1 represents a view from the first virtual waypoint 962a looking in the direction of the first view direction 904a (e.g., toward the northeast, in the illustrated example).

The process of presenting a first gaze view 719-1 associated with the first view direction 904a in some implementations further includes presenting a first gaze view 719-1 from the perspective of one of the view elevations (e.g., view elevations 906-1, 906-2, and so forth).

Block 1514 of FIG. 15 describes an example step of presenting, on the display, one or more secondary gaze views, 719-2 through 719-8. In some implementations, the secondary gaze views are presented in order, clockwise, according to the set of view directions 904. For example, where the first gaze view 719-1 includes an image associated with the first view direction 904a (e.g., toward the northeast), the second gaze view 719-2 includes an image toward the east, the third gaze view 719-3 includes an image toward the southeast, and so forth. In this aspect, the first gaze view 719-1 serves as a starting point when presenting the secondary gaze views.

The process of presenting one or more secondary gaze views, in some implementations, further includes presenting one or more secondary gaze views from the perspective of one of the view elevations (e.g., view elevations 906-1, 906-2, and so forth).

The process of presenting gaze views (e.g., a first gaze view 719-1 and one or more secondary gaze views 719-1 through 719-8; collectively 719-n) provides additional context about the first virtual waypoint 962a, relative to other features of the virtual environment. Viewing the gaze views 719-n on a display provides the user with a low-resolution preview from the point of view of a user located near the first virtual waypoint 962a along the virtual path 960. As shown in FIG. 10A, the first view direction 904a need not precisely align with the first waypoint gaze vector 965a. Accordingly, the corresponding gaze views represent a rough approximation of the view from the first virtual waypoint 962a. For example, if the user observes that the gaze views 719-n presented on the display are unacceptable, the user may elect to use the first recording device 726 to record another primary reference set 610.

In a related aspect, the process of presenting the gaze views 719-n on a display provides the user with a low-resolution preview of a variety of virtual objects in the selected virtual environment 900. In some implementations, the virtual path 960 includes depth information about the location of virtual objects that are part of the selected virtual environment 900. For example, a selected virtual environment 900 typically includes a variety of virtual objects, such as surfaces, structures, vehicles, people, equipment, natural features, and other types of objects, both realistic and fanciful, static and moving. Each virtual object may be located at known positions expressed in coordinates relative to the selected virtual environment 900. Generating the virtual path 960 includes calculating a depth map that includes the virtual locations of one or more virtual objects, relative to the virtual path 960. Locating the virtual objects on a depth map facilitates the accurate rendering and display of the virtual objects relative to a user traversing the virtual path 960.

In a related aspect, the process of rendering a series of virtual images 970 in some implementations includes estimating a character eye location relative to the location and orientation of the camera(s) on a headset. The virtual environment data typically includes data about character eye location relative to one or more headsets. Eye location is particularly useful when rendering virtual images that include objects located very close to the character, such as the character's own arms, hands, and other body parts. Accurate rending of such close-up objects generates a more authentic and life-like experience. In this example implementation, the ground truth dataset generation system 1000 estimates the character eye location relative to the camera, which produces a calculated series of poses in which each pose is persistently associated with the estimated eye location. By correlating each pose with the estimated eye location, the body part images are rendered in positions that are closely and persistently associated with the estimated character eye location, thereby producing virtual images of body parts that are closely correlated with the user's viewpoint (i.e., egocentric). In this example, the process of rendering a series of virtual images 970 includes rendering a series of character body part images that are persistently associated with the estimated character eye location.

The process of rendering a series of virtual images 970 consumes a great deal of computing resources and time. For example, rendering three hundred frames of high-quality AR video (which, at thirty frames per second, will produce ten seconds of video) can take up to twenty-four hours for existing systems to complete. Additional processing, involving depth images and multiple camera views, along relatively longer trajectories, and with custom configurations can take as long as twenty days for existing systems to complete.

Figure 11:
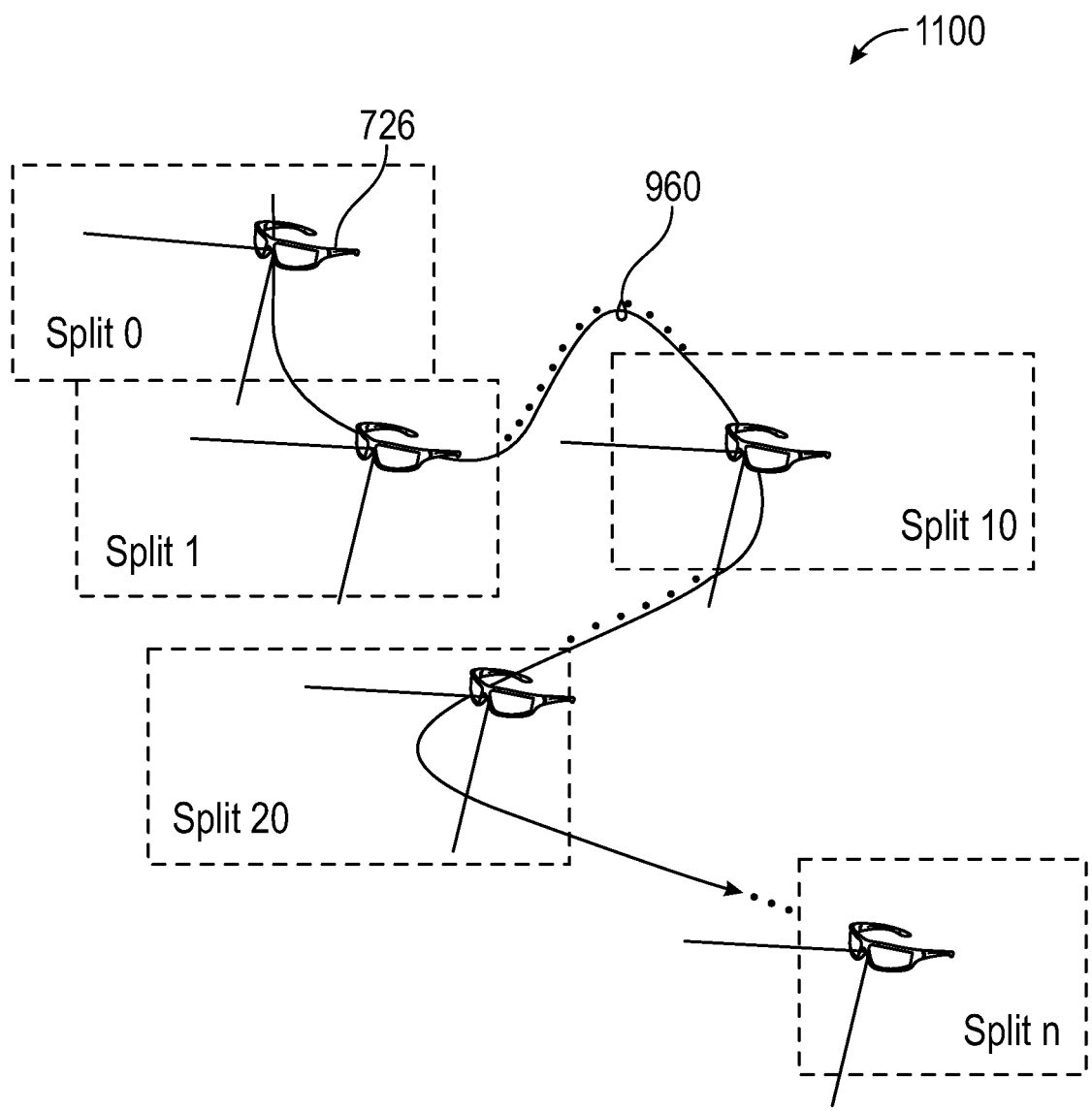
FIG. 11 is a diagrammatic illustration of an example application of a parallelization utility.

FIG. 11 is a conceptual diagram 1100 illustrating a parallelization utility 466 relative to a virtual path 960. The image rendering application 464, in some implementations, utilizes a parallelization utility 466 which parses data into subsets called splits to be processed in parallel and thereby reduce processing time. For example, the parallelization utility 466 determines an optimal number of splits (e.g., split zero through split n, as shown) based on the virtual path 960. Each split processes a subset of the virtual path 960 produces a portion of the rendered series of virtual images 970. Each split has a unique timestamp, which facilitates the ordered assembly of the results from each split after processing.

The image rendering application 464, in some implementations, utilizes a rolling shutter simulation engine 468 that processes one or more images to simulate a rolling shutter effect which, if selected, is applied to sequences of frames of video data. Rolling shutter is a method of image processing in which each frame of a video is captured by scanning across the frame rapidly, either vertically or horizontally. The rapid scanning occurs over a short time period, at a time interval called the readout time (e.g., between thirty and one hundred microseconds). An image processed using the rolling shutter method typically includes a series of rows a few pixels wide, where each row is scanned at a different time. The rows in the frame are recorded at different times; however, after processing, the entire frame is displayed at the same time during playback (as if it represents a single instant in time). Longer readout times may result in noticeable motion artifacts and distortion. Images processed for feature films typically use a shorter readout time, to minimize artifacts and distortion.

The rolling shutter simulation engine 468 in some implementations includes the simulated scanning, by rows, of the pixels in a subset of virtual images selected from the rendered series of virtual images 970. The rolling shutter simulation engine 468, when applied to a first virtual image, for example, typically produces one or more rendered images having so much distortion that a single pixel from the first virtual image is located in multiple pixel locations in the rendered images. To minimize the distortion caused by this effect, the rolling shutter simulation engine 468 in some implementations calculates an expected pose for each image in the subset of virtual images. For example, the sequence of camera poses 630 described herein includes one or more vectors associated with each point along the path 612. To calculate an expected pose for the series of virtual images 970 in the output dataset 990, the rolling shutter simulation engine 468 in some implementations interpolates the series of camera posts 630 over time, as applied to the series of virtual images 970 (e.g., including the images immediately preceding and following a selected first virtual image). The expected poses for subsequent rendered images, in some examples, include an expected pose for each row of pixels in the first virtual image. To speed processing, the rolling shutter simulation engine 468 in some implementations accesses and applies the parallelization utility 466.

Use Cases

In accordance with an example use case for the ground truth dataset generation system 1000, the output dataset 990 represents a simulated sensor configuration, in motion, traversing a virtual path 960 through a virtual environment 900. The output dataset 990 is very closely correlated with the first recording device 726 which captured data about the movements of the device 726 as it moved through a real, physical environment. Accordingly, the output dataset 990 produces a realistic and lifelike VR experience, especially for a user who is wearing a headset with equipment that is the same or similar to the equipment on the first recording device 726.

In accordance with another example use case for the ground truth dataset generation system 1000, the output dataset 990 is useful in training one or more machine-learning algorithms which are part of many VR systems.

Machine learning refers to an algorithm that improves incrementally through experience. By processing a large number of different input datasets, a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

In the context of computer vision and VR systems, mathematical models attempt to emulate the tasks accomplished by the human visual system, with the goal of using computers to extract information from an image and achieve an accurate understanding of the contents of the image. Computer vision algorithms have been developed for a variety of fields, including artificial intelligence, autonomous navigation, and VR systems, to extract and analyze the data contained in digital images and video.

In accordance with this example use case, the output dataset 990 is used to generate a large number of different sample output datasets, which are useful for training the machine-learning algorithms which are part of many VR systems. For example, as shown in FIG. 7D, the system 1000 includes an offset component 740 and a configurations component 750. In use, an output dataset 990 may be generated with the translation coordinates 741 of the offset component 740 set to zero. In other words, the recorded trajectory 910 starts at the origin (zero, zero, zero). Then, using the same selected components, except selecting a different set of translation coordinates 741, such as (two, six, six) for example, another sample output dataset is generated, which is identical in nearly all respects to the first dataset except that the trajectory starts at a different location. Similarly, using additional selections, any or all of the different components of the configurations component 750 may be changed, perhaps hundreds of times, thus generating a large number of different sample output datasets. In practice, a single output dataset 990 can be used to generate a nearly unlimited number of related, but slightly different, sample output datasets 995. Because the generating of multiple sample output datasets takes a long time, the parallelization utility 466 may be used to parse the data into splits for processing in parallel, as described herein. Using multiple sample output datasets that include one or more common attributes (e.g., a particular headset) are especially useful for training ML algorithms. Each sample output dataset can be used to train the ML algorithm which improves the operation of the VR system as a whole. For example, an ML algorithm trained with sample output datasets which were all generated using a first recording device 726 will produce a particularly robust and well-trained ML algorithm for later users of a VR headset with equipment that is the same or similar to the equipment on the first recording device 726.

In accordance with another example use case for the ground truth dataset generation system 1000, the output dataset 990 is useful in testing new or different components, in combination with other components. For example, the system 1000 may be used to construct a hypothetical headset with a simulated sensor configuration 760, as described herein, which is then used generate an output dataset 990. After processing, the user can view the VR experience that was created using the output dataset 990 and evaluate the performance of the simulated sensor configuration 760. For example, the simulated sensor configuration 760 may produce a VR experience that is unclear, unstable, or otherwise unsatisfactory. In subsequent iterations, the simulated sensor configuration 760 can be changed, and the user can view and evaluate the subsequent resulting VR experience.

In accordance with another example use case, the ground truth dataset generation system 1000 generates a plurality of sample output datasets by selecting and applying modified sample rates during processing. In this aspect, the process of generating an output dataset 990 (at block 1414) in some implementations includes selecting and applying a modified sample rate, and then generating one or more sample output datasets based on the modified sample rate. For example, the CTT function 640 may generate a first output dataset that includes data points based on a first sample rate (e.g., thirty-six samples per second). The first sample rate can be changed to a modified sample rate (e.g., seventy-two samples per second) thereby generating a new sample output dataset—which is generated using the same CTT function 640. The process of selecting and applying different modified sample rates, in this application, may be used to generate many additional sample output datasets, which are especially useful for training the ML algorithms described herein, thereby improving the accuracy and operation of VR systems.

In accordance with another example use case, the ground truth dataset generation system 1000 generates another sample output dataset by applying a modified bending angle during the process of rendering a series of virtual images. The bending angle describes the angular association between a first camera direction and a second camera direction, for headsets that include two cameras spaced apart. Although the camera directions on a headset are typically intended to be parallel (i.e., a bending angle of zero), most headsets are subject to bending during use, thereby resulting a bending angle between the cameras which is not zero. For example, while recording a trajectory, subtle head motions may result in a measurable bending angle, which in turn will impact the images gathered by the first camera relative to the second camera. During the process of calculating a sequence of camera poses 630 as part of the headset trajectory 910, as described herein, each pose vector is based on the camera orientation at each point along the path 612 where each image was captured. When two cameras are present, each camera orientation is based on the first camera direction, the second camera direction, and the bending angle. In this aspect, the bending angle impacts the process of calculating the series of pose vectors and poses. During processing, the ground truth dataset generation system 1000 may be used to select and apply a modified bending angle (e.g., different from the measured or actual bending angle) and thereby generate one or more additional sample output datasets based on the modified bending angle. Applying a variety of modified bending angles generates many additional sample output datasets, which are especially useful for training the ML algorithms described herein, thereby improving the accuracy and operation of VR systems.

Any of the functionality described herein for the wearable or eyewear device 100, the client device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure.

This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of generating a ground truth output dataset using an electronic eyewear device comprising a processor, a camera, and an inertial measurement unit, the method comprising steps of:
   recording a primary reference set using the electronic eyewear device in motion traversing a path through a physical environment, wherein the primary reference set comprises a series of real images captured by the camera and a series of real motion data captured by the inertial measurement unit;
   calculating, by the processor, a headset trajectory based on the primary reference set;
   generating, by the processor, a continuous time trajectory function for interpolating the headset trajectory relative to the series of real motion data; and
   generating, by the processor, an output dataset associated with a simulated sensor configuration and in accordance with the continuous time trajectory function, wherein the simulated sensor configuration comprises one or more simulated cameras and one or more simulated inertial measurement unit sensors, such that the output dataset represents the simulated sensor configuration in motion along a virtual path through a first virtual environment.

2. The method of claim 1, wherein the series of real images is captured by the camera at an image sample rate,
   wherein the series of real motion data is captured by the inertial measurement unit at an inertial sample rate,
   wherein the headset trajectory comprises a sequence of camera poses associated with a primary sample rate, and
   wherein the step of generating the output dataset further comprises:
   generating the output dataset in accordance with the continuous time trajectory function and with a modified sample rate, wherein the modified sample rate is a rate selected from the group consisting of the image sample rate, the inertial sample rate, a divisor of the image sample rate and the inertial sample rate, the primary sample rate, and an arbitrary sample rate.

3. The method of claim 2, further comprising:
   presenting on a display a trace corresponding to at least a portion of the virtual path on a display as an overlay relative to a map view associated with a first virtual environment, wherein the virtual path is characterized by one or more virtual waypoints and waypoint gaze vectors that are correlated with the sequence of camera poses;
   applying a framework to the virtual path, the framework comprising a plurality of cells associated with the virtual map;
   for each of the plurality of cells, storing in a cache a set of gaze views, each view characterized by a view direction and a view elevation relative to the first virtual environment;
   selecting a first virtual waypoint along the virtual path, wherein the first virtual waypoint comprises a first waypoint gaze vector;
   identifying a first cell nearest to a first virtual waypoint;
   selecting a first view direction most closely aligned with the first waypoint gaze vector;
   retrieving from the cache and presenting on the display a first gaze view associated with the first view direction;
   presenting on the display a segment of the virtual path and a range icon positioned along the segment according to the first virtual waypoint; and
   presenting one or more secondary gaze views associated with the first cell.

4. The method of claim 1, wherein the step of generating the output dataset further comprises:
   for each of the one or more simulated cameras, rendering a series of virtual images associated with the first virtual environment; and
   for each of the one or more simulated inertial measurement unit sensors, generating a series of simulated inertial measurement unit data.

5. The method of claim 4, wherein the step of rendering the series of virtual images further comprises:
   determining, based on the continuous time trajectory function, an optimal number of splits for parallel processing;
   processing each of the splits in a parallel operation, wherein each of the splits produces a portion of the series of virtual images associated with the series of simulated inertial measurement unit data, each portion having a unique timestamp; and
   combining the splits according to the unique timestamps.

6. The method of claim 4, wherein the step of rendering the series of virtual images further comprises:
   adjusting a simulated exposure time for a first subset of images according to a motion blur setting;
   adjusting a time offset between the one or more simulated cameras for a second subset of images according to a time offset setting; and
   applying a rolling shutter effect for a select subset of images according to one or more rolling shutter parameters.

7. The method of claim 1, wherein the first virtual environment comprises one or more virtual objects located at known positions relative to a virtual map, and wherein the step of generating the output dataset further comprises:
   calculating a depth map comprising a virtual location associated with at least one of the one or more virtual objects relative to the virtual path.

8. The method of claim 1, wherein the step of generating the continuous time trajectory function further comprises:
   identifying a polynomial equation comprising a basis function and one or more fitting coefficients, wherein the basis function includes one or more Chebyshev polynomials;
   calculating, for a first time interval, a first set of values for the one or more fitting coefficients, such that the polynomial equation with the first set of values generates a first curve that approximates both the headset trajectory and the series of real motion data during the first time interval; and calculating, for a subsequent time interval, a subsequent set of values for the one or more fitting coefficients, such that the polynomial equation with the subsequent set of values generates a subsequent curve that approximates both the headset trajectory and the series of real motion data during the subsequent time interval.

9. The method of claim 1, further comprising:

receiving an initial offset position and an initial orientation relative to a virtual map associated with the first virtual environment; and using the continuous time trajectory function, generating an offset output dataset that represents the simulated sensor configuration in motion along an offset virtual path in accordance with the initial offset position and the initial orientation.

10. The method of claim 1, wherein the step of generating the output dataset further comprises:

presenting on a display a sensor array model representing the simulated sensor configuration, the model comprising an arrangement of one or more selectable sensors;

presenting on the display as an overlay relative to the sensor array model a transient anchor placed by a cursor; and responsive to movement of the transient anchor by the cursor, rotating the sensor array model on the display.

11. A system comprising:

an electronic eyewear device comprising a processor, a camera, and an inertial measurement unit;

a trajectory recording application configured to record a primary reference set using the electronic eyewear device in motion traversing a path through a physical environment, wherein the primary reference set comprises a series of real images captured by the camera and a series of real motion data captured by the inertial measurement unit;

a headset trajectory based on the primary reference set;

a polynomial interpolation module configured to generate a continuous time trajectory function for interpolating the headset trajectory relative to the series of real motion data; and an output dataset associated with a simulated sensor configuration and generated in accordance with the continuous time trajectory function, wherein the simulated sensor configuration comprises one or more simulated cameras and one or more simulated inertial measurement unit sensors, such that the output dataset represents the simulated sensor configuration in motion along a virtual path through a first virtual environment.

12. The system of claim 11, wherein the series of real images is captured by the camera at an image sample rate, wherein the series of real motion data is captured by the inertial measurement unit at an inertial sample rate, wherein the headset trajectory comprises a sequence of camera poses associated with a primary sample rate, and wherein the output dataset is generated in accordance with the continuous time trajectory function and with a modified sample rate, wherein the modified sample rate is a rate selected from the group consisting of the image sample rate, the inertial sample rate, a divisor of the image sample rate and the inertial sample rate, the primary sample rate, and an arbitrary sample rate.

13. The system of claim 11, further comprising an image rendering application configured, for each of the one or more simulated cameras, to render a series of virtual images associated with the first virtual environment, and for each of the one or more simulated inertial measurement unit sensors, to generate a series of simulated inertial measurement unit data.

14. The system of claim 11, further comprising a parallelization utility configured to:

determine, based on the continuous time trajectory function, an optimal number of splits for parallel processing;

process each of the splits in a parallel operation, wherein each of the splits produces a portion of the series of virtual images associated with the series of simulated inertial measurement unit data, each portion having a unique timestamp; and combine the splits according to the unique timestamps.

15. The system of claim 11, wherein the polynomial interpolation module is further configured to:

identify a polynomial equation comprising a basis function and one or more fitting coefficients, wherein the basis function includes one or more Chebyshev polynomials;

calculate, for a first time interval, a first set of values for the one or more fitting coefficients, such that the polynomial equation with the first set of values generates a first curve that approximates both the headset trajectory and the series of real motion data during the first time interval; and calculate, for a subsequent time interval, a subsequent set of values for the one or more fitting coefficients, such that the polynomial equation with the subsequent set of values generates a subsequent curve that approximates both the headset trajectory and the series of real motion data during the subsequent time interval.

16. A non-transitory computer-readable medium storing program code that, when executed, is operative to cause a processor of an eyewear device to perform steps of:

recording a primary reference set using the eyewear device in motion traversing a path through a physical environment, wherein the primary reference set comprises a series of real images captured by a camera coupled to the eyewear device and a series of real motion data captured by an inertial measurement unit coupled to the eyewear device;

calculating, by the processor, a headset trajectory based on the primary reference set;

generating, by the processor, a continuous time trajectory function for interpolating the headset trajectory relative to the series of real motion data; and generating, by the processor, an output dataset associated with a simulated sensor configuration and in accordance with the continuous time trajectory function, wherein the simulated sensor configuration comprises one or more simulated cameras and one or more simulated inertial measurement unit sensors, such that the output dataset represents the simulated sensor configuration in motion along a virtual path through a first virtual environment.

17. The non-transitory computer-readable medium storing program code of claim 16, wherein the program code when executed is operative to cause the processor to perform the further steps of:

capturing the series of real images at an image sample rate;

capturing the series of real motion data at an inertial sample rate;

calculating the headset trajectory such that it comprises a sequence of camera poses associated with a primary sample rate; and generating the output dataset in accordance with the continuous time trajectory function and with a modified sample rate, wherein the modified sample rate is a rate selected from the group consisting of the image sample rate, the inertial sample rate, a divisor of the image sample rate and the inertial sample rate, the primary sample rate, and an arbitrary sample rate.

18. The non-transitory computer-readable medium storing program code of claim 16, wherein the program code when executed is operative to cause the processor to perform the further steps of:

for each of the one or more simulated cameras, rendering a series of virtual images associated with the first virtual environment; and for each of the one or more simulated inertial measurement unit sensors, generating a series of simulated inertial measurement unit data.

19. The non-transitory computer-readable medium storing program code of claim 16, wherein the program code when executed is operative to cause the processor to perform the further steps of:

identifying a polynomial equation comprising a basis function and one or more fitting coefficients, wherein the basis function includes one or more Chebyshev polynomials;

calculating, for a first time interval, a first set of values for the one or more fitting coefficients, such that the polynomial equation with the first set of values generates a first curve that approximates both the headset trajectory and the series of real motion data during the first time interval; and calculating, for a subsequent time interval, a subsequent set of values for the one or more fitting coefficients, such that the polynomial equation with the subsequent set of values generates a subsequent curve that approximates both the headset trajectory and the series of real motion data during the subsequent time interval.

20. The non-transitory computer-readable medium storing program code of claim 16, wherein the program code when executed is operative to cause the processor to perform the further steps of:

receiving an initial offset position and an initial orientation relative to a virtual map associated with the first virtual environment; and using the continuous time trajectory function, generating an offset output dataset that represents the simulated sensor configuration in motion along an offset virtual path in accordance with the initial offset position and the initial orientation.

* * * * *